(12) United States Patent
Asveren et al.

(10) Patent No.: US 11,233,858 B2
(45) Date of Patent: *Jan. 25, 2022

(54) METHODS AND APPARATUS FOR MANAGING THE USE OF IP ADDRESSES

(71) Applicant: Ribbon Communications Operating Company, Inc., Westford, MA (US)

(72) Inventors: Tolga Asveren, Bordentown, NJ (US); Nagesh Kumar Bollapalli, Bangalore (IN)

(73) Assignee: Ribbon Communications Operating Company, Inc., Westford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/533,329

(22) Filed: Aug. 6, 2019

(65) Prior Publication Data

US 2019/0364115 A1   Nov. 28, 2019

Related U.S. Application Data

(63) Continuation of application No. 15/015,290, filed on Feb. 4, 2016, now Pat. No. 10,419,544.

(30) Foreign Application Priority Data

Dec. 22, 2015   (IN) .......................... 6819/CHE/2015

(51) Int. Cl.
    *H04L 29/08* (2006.01)
    *H04L 29/06* (2006.01)
    *H04L 29/12* (2006.01)

(52) U.S. Cl.
    CPC .......... *H04L 67/141* (2013.01); *H04L 61/255* (2013.01); *H04L 61/2514* (2013.01);
    (Continued)

(58) Field of Classification Search
    CPC ............... H04L 67/141; H04L 61/2007; H04L 65/1006
    (Continued)

(56) References Cited

U.S. PATENT DOCUMENTS

2003/0106067 A1* 6/2003 Hoskins .............. H04L 12/2801
                                                              725/119
2005/0076108 A1* 4/2005 Li ........................ H04L 65/1023
                                                              709/223
2016/0057208 A1* 2/2016 Parikh ................. H04L 65/1046
                                                              714/4.11

* cited by examiner

*Primary Examiner* — David R Lazaro
*Assistant Examiner* — Zia Khurshid
(74) *Attorney, Agent, or Firm* — Straub & Straub; Stephen T. Straub; Michael P. Straub

(57) ABSTRACT

The present invention relates to communications methods, apparatus and systems for efficiently managing NAPT bindings and mappings. An exemplary embodiment of operating a communication system includes the steps of (i) receiving, at a real-time communications entity, a media session offer from a device, (ii) transmitting, from the communications entity to a Network Address and Port Translation entity (NAPT), a request signal to allocate a public Internet Protocol (IP) address and port number pair corresponding to an interface on the NAPT for the session; (iii) determining, at the communications entity, a remote IP address and port number pair corresponding to an interface on the device to be used for communicating media of the media session; (iv) transmitting, from the communications entity to the NAPT, a signal identifying the determined remote IP address and port number pair; and (v) releasing, at the NAPT, the allocated public IP address and port number pair.

20 Claims, 23 Drawing Sheets

(52) U.S. Cl.
CPC ...... *H04L 61/2517* (2013.01); *H04L 65/1006* (2013.01); *H04L 65/1069* (2013.01); *H04L 61/2564* (2013.01); *H04L 61/2575* (2013.01); *H04L 61/2589* (2013.01)

(58) Field of Classification Search
USPC ......................................................... 709/227
See application file for complete search history.

| | NAPT SESSION STATE IP/PORT BINDING MAPPING TABLE | | | | |
|---|---|---|---|---|---|
| 1 | SESSION STATE | ALLOCATED NAPT PUBLIC IP/PORT | LOCAL PUBLIC IP/PORT | REMOTE IP/PORT | SBC PRIVATE IP/PORT |
| 2' | MEDIA SESSION-1 ON-GOING | PUBLIC IP/PORT-J | * | IP/PORT-B | SBC IP/PORT-3 |
| 3' | MEDIA SESSION-2 ON-GOING | PUBLIC IP/PORT-J | * | IP/PORT-D | SBC IP/PORT-4 |

| FIGURE 10A |
|---|
| FIGURE 10B |
| FIGURE 10C |
| FIGURE 10D |
| FIGURE 10E |
| FIGURE 10F |
| FIGURE 10G |

| | NAPT SESSION STATE IP/PORT BINDING MAPPING TABLE | | | | |
|---|---|---|---|---|---|
| 1 | SESSION STATE | ALLOCATED NAPT PUBLIC IP/PORT | LOCAL PUBLIC IP/PORT | REMOTE IP/PORT | SBC PRIVATE IP/PORT |
| 2 | LEARNING PHASE FOR MEDIA SESSION-1 | PUBLIC IP/PORT-J | PUBLIC IP/PORT-J | * | SBC IP/PORT-3 |
| 2' | LEARNING PHASE FOR MEDIA SESSION-1 COMPLETED SESSION ON-GOING | PUBLIC IP/PORT-J (NOTE BINDING REMAINS ALTHOUGH RESERVATION ON LOCAL PUBLIC IP/PORT-J HAS BEEN RELEASED) | * (NO ENTRY AS LOCAL IP/PORT-J HAS BEEN RELEASED, I.E., ANY MEDIA PACKETS RECEIVED AT NAPT IP/PORT-J WITHOUT A MATCHING REMOTE IP/PORT IN THIS BINDING TABLE WILL BE DISCARDED) | IP/PORT-B  IP/PORT-B IS THE ACTUAL IP/PORT ADDRESS BEING USED BY UE 1 FOR MEDIA SESSION-1 LEARNED BY SBC) | SBC IP/PORT-3 |
| 3 | LEARNING PHASE FOR MEDIA SESSION-2 | PUBLIC IP/PORT-J | PUBLIC IP/PORT-J (RESERVED FOR MEDIA SESSION-2, I.E., ANY MEDIA PACKETS RECEIVED AT NAPT IP/PORT-J WITHOUT A MATCHING REMOTE IP/PORT IN THIS BINDING TABLE WILL BE SENT TO SBC IP/PORT-4) | * (NO ENTRY AS REMOTE IP/PORT FOR UE 2 UNKNOWN DURING LEARNING PHASE) | SBC IP/PORT-4 |
| 3' | LEARNING PHASE FOR MEDIA SESSION-2 COMPLETE | PUBLIC IP/PORT-J (NOTE BINDING REMAINS ALTHOUGH RESERVATION ON LOCAL PUBLIC IP/PORT-J HAS BEEN RELEASED) | * (NO ENTRY AS LOCAL IP/PORT-J HAS BEEN RELEASED, I.E., ANY MEDIA PACKETS RECEIVED AT NAPT IP/PORT-J WITHOUT A MATCHING REMOTE IP/PORT IN THIS BINDING TABLE WILL BE DISCARDED) | IP/PORT-D  IP/PORT-D IS THE ACTUAL IP/PORT ADDRESS BEING USED BY UE 1 FOR MEDIA SESSION-1 LEARNED BY SBC) | SBC IP/PORT-4 |

FIGURE 11 ations entity 160 requires the use of an IP address/port pair.
METHODS AND APPARATUS FOR MANAGING THE USE OF IP ADDRESSES

RELATED APPLICATION

The present application is a continuation of U.S. patent application Ser. No. 15/015,290 which was filed on Feb. 4, 2016 and published as U.S. Patent Application Publication No. US 2017-0180484 A1 on Jun. 22, 2017 and which claims the benefit of the filing date of Indian Provisional Application S.N. 6819/CHE/2015 which was filed on Dec. 22, 2015. Each of the aforementioned patent applications being hereby expressly incorporated by reference in its entirety.

FIELD OF INVENTION

The present invention relates to methods and apparatus for managing the use of Internet Protocol Addresses and more particularly to managing the use of IP addresses in connection with network address translation bindings.

BACKGROUND

Real Time Communications over Internet Protocol (IP) has two components: signaling and media. On each device, usually a single IP Address/port pair is used for all signaling. For media (e.g., communication of Real-Time Transport Protocol packets) a different IP Address/port pair is used for each session. If control packets are used for media (e.g., communication of Real-Time Transport Control Protocol packets) these also consume another IP Address/port pair. Furthermore, a communication session may consist of several components such as for example, audio and video, and each component consumes an IP Address/port pair. While there are some mechanisms to bundle all components/control packets so that they consume a single IP Address/port pair, these mechanisms are not widely deployed, and their use does not change the fact that for each communication session media consumes at least an IP Address/port pair. FIG. 1A illustrates a real time communication entity/network device 160 in which signaling 180, for example control signaling such as Session Initiation Protocol packets, are communicated to/from the Internet Protocol address/port pair IP-1/port-1 180 on real time communication entity/network device 160, while media for communications session-1 182 is communicated to/from IP address/port pair IP-1/port-2 164, media for communications session-2 184 is communicated to/from IP address/port pair IP-1/port-3 166, media for communications session-3 186 is communicated to/from IP address/port pair IP-1/port-4, . . . , media for session-N 188 is communicated to/from IP address/port pair IP-1/port-N+1 170. The control signal and the media for each of the sessions supported by the real time communications entity 160 requires the use of an IP address/port pair.

Many systems use Real-Time Transport Protocol over User Datagram Protocol (UDP) for the communication of media. The destination port field in the UDP header is 16 bits which limits the maximum number of ports to 65536. This means that a single IP address can only be used for media components of 6556 simultaneous communication sessions. The media component of the next communication session requires the use of a new IP Address.

When dealing with consumer endpoints in the Internet domain, network elements need to use public IP Addresses so that they can send and receive IP packets. Internet Protocol version 4 (IPV4 is the dominant IP version currently in use for the Internet and it is scarce due to its 32 bit address field.

There are additional issues which are particularly relevant for Session Border Controller (SBC) cloud deployments when it comes to excessive use of IP addresses. Certain redundancy schemes utilize modestly sized Virtual Machines (VMs) to achieve better failover characteristics and performance. However, these redundancy schemes increase the number of total Virtual Machine instances and using a public IP address for each instance is not a preferable option as it would inefficiently use the scarce IP addresses.

In addition, there is also the issue of large broadcast domains in large cloud deployments utilizing Overlay Networks. These Overlay Networks provide OSI Layer-2 (data link layer) semantics across Virtual Machine instances distributed across various subnets by using various tunneling technologies. Each virtual machine instance being a software implementation that emulates a physical computer system. The larger the number of IP Addresses used the greater the burden of the broadcast traffic. This is an issue with both Internet Protocol version 4 (IPv4) and Internet Protocol version 6 (IPv6).

From the above discussion, it should be appreciated that there is a need for improved methods and apparatus for efficiently managing the use of IP addresses and for communications solutions that reduce the number of public IP addresses used. Furthermore, there is a need for methods and apparatus that reduce the number of public/routable IP addresses used by Virtual Machine instances. These are Internet and communication centric problems concerning how to efficiently use and manage the limited number of Internet Protocol addresses available.

SUMMARY

The present invention is directed to various features relating to methods and apparatus for efficiently managing public/routable IP addresses. The present invention also provides new methods and apparatus that reduce the number of public/routable IP addresses used by Network Address and Port Translation (NAPT) devices, Internet Protocol Multiplexer entities and Virtual Machine instances of such devices. The present invention addresses the problems described above.

One embodiment of the invention includes a method of operating a communication system comprising the steps of (i) receiving, at a real time communications entity such as a session border controller, a first media session offer from a first device, (ii) transmitting, from the real time communications entity to a Network Address and Port Translation (NAPT) entity, a request signal to allocate a public Internet Protocol (IP) address and port number pair corresponding to an interface on the NAPT entity for the first session; (iii) determining, at the real time communications entity, a remote IP address and port number pair corresponding to an interface on the first device to be used for communicating media of the first media session; (iv) transmitting, from the real time communications entity to the NAPT entity, a signal identifying the determined remote IP address and port number pair; and (v) releasing, at the NAPT entity, the allocated public IP address and port number pair.

In some such embodiments the media session offer is transmitted from the first device to an interface corresponding to a public IP address/port number pair of the real time communications entity. The session offer of the method may be, and in some embodiments is, included in a Session Description Protocol offer message included in a Session Initiation Protocol INVITE message transmitted from the first device to the real time communications entity. In some embodiments of the invention the session answer is included in a Session Description Protocol answer message included in a SIP response message transmitted from the real time communications entity (SBC) to the first device.

In some embodiments of the invention the real time communications entity is a Session Border Controller. In some of such embodiments, the Session Border Controller is implemented as a virtual machine deployed on a computer in the cloud.

In some embodiments of the invention, the NAPT entity is implemented as a virtual machine deployed on a computer in the cloud.

In some embodiments of the invention the real time communications entity is a Session Border Controller that uses an Interactive Connectivity Establishment protocol procedure to determine the actual remote IP address and port number pair used for media.

In some embodiments of the invention, the Session Border Controller determines the remote IP address and port number pair used for media from the first Real Time Transport Protocol (RTP) packet of the first media session received by the Session Border controller.

In some embodiments of the invention, the first media session offer is a Session Description Offer message identifying at least one media stream included in a SIP Invite message.

In some embodiments of the invention, the answer to the first media session offer is a SDP answer message including the local public IP address and port number pair allocated by the NAPT entity.

In some embodiments of the invention, the NAPT entity performs an Internet Protocol address multiplexing operation.

In some embodiments of the invention, the NAPT allocates the released local IP address public IP address and port number pair for use in connection with a second media session while said first media session is still active.

Another embodiment of the invention includes the method of operating a communications system, comprising the steps of: receiving at a public IP address and port number pair interface of a real time communications entity, an offer for a media session from a first device; receiving media packets at an interface corresponding to a public IP address and port number pair of a network address and port translation (NAPT) device, allocated to said media session; obtaining a private Internet protocol address and port number pair from a translation table corresponding to an interface on the real time communications device allocated for sending and receiving media packets of said media session based on a reserved local public IP address and port number pair when the real time communications entity is operating in a learning mode of operation with respect to determining the remote IP address and port number pair being used by the first device for the media session.

In some of such embodiments, the method further includes the step of obtaining the private Internet protocol address and port number pair from the translation table corresponding to the interface on the real time communications device allocated for sending and receiving media packets of said media session based on the remote IP address and port number pair being used by the first device for the media session when the real time communications entity is operating in a completed learning mode of operation with respect to determining the remote IP address and port number pair being used by the first device for the media session.

Apparatus and systems that implement the aforementioned methods are also within the scope of the invention.

In a communications system embodiment, the communications system comprises: (i) a Network Address and Port Translation entity (NAPT); and (ii) a real time communications entity including: (a) a receiver configured to receive a first media session offer from a first device (UE1); (b) a transmitter configured to transmit from the real time communications entity (SBC) to the Network Address and Port Translation (NAPT) entity, a request signal to allocate a public Internet Protocol (IP) address and port number pair corresponding to an interface on the NAPT entity for the first session; (c) a determinator or determination module configured to determine a remote IP address and port number pair corresponding to an interface on the first device (UE 1) to be used for communicating media of the first media session; the transmitter further configured to transmit, from the real time communications entity (SBC) to the NAPT entity, a signal identifying the determined remote IP address and port number pair; and said NAPT entity including: a release module configured to release, at the NAPT entity, the allocated public IP address and port number pair.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 illustrates the combination of FIGS. 10A, 10B, 10C, 10D, 10E, 10F, and 10G.

FIG. 11 illustrates a NAPT session state IP/port binding mapping table in accordance with one exemplary embodiment of the present invention.

FIG. 12 illustrates a NAPT session state IP/port binding mapping table in accordance with one exemplary embodiment of the present invention.

DETAILED DESCRIPTION

Figure 1A:
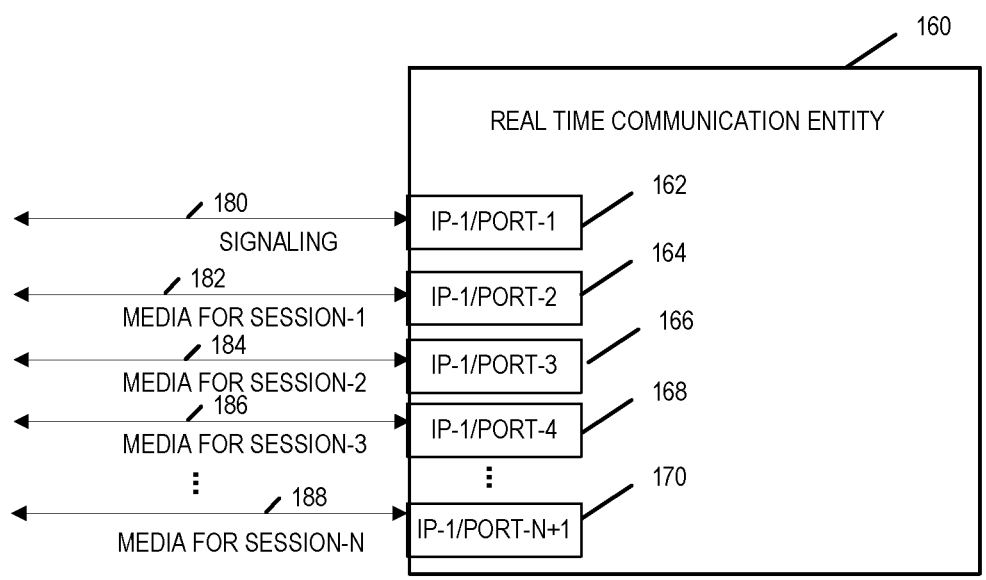
FIG. 1A illustrates a real-time communication entity using a plurality of IP address/port pairs.
Figure 1B:
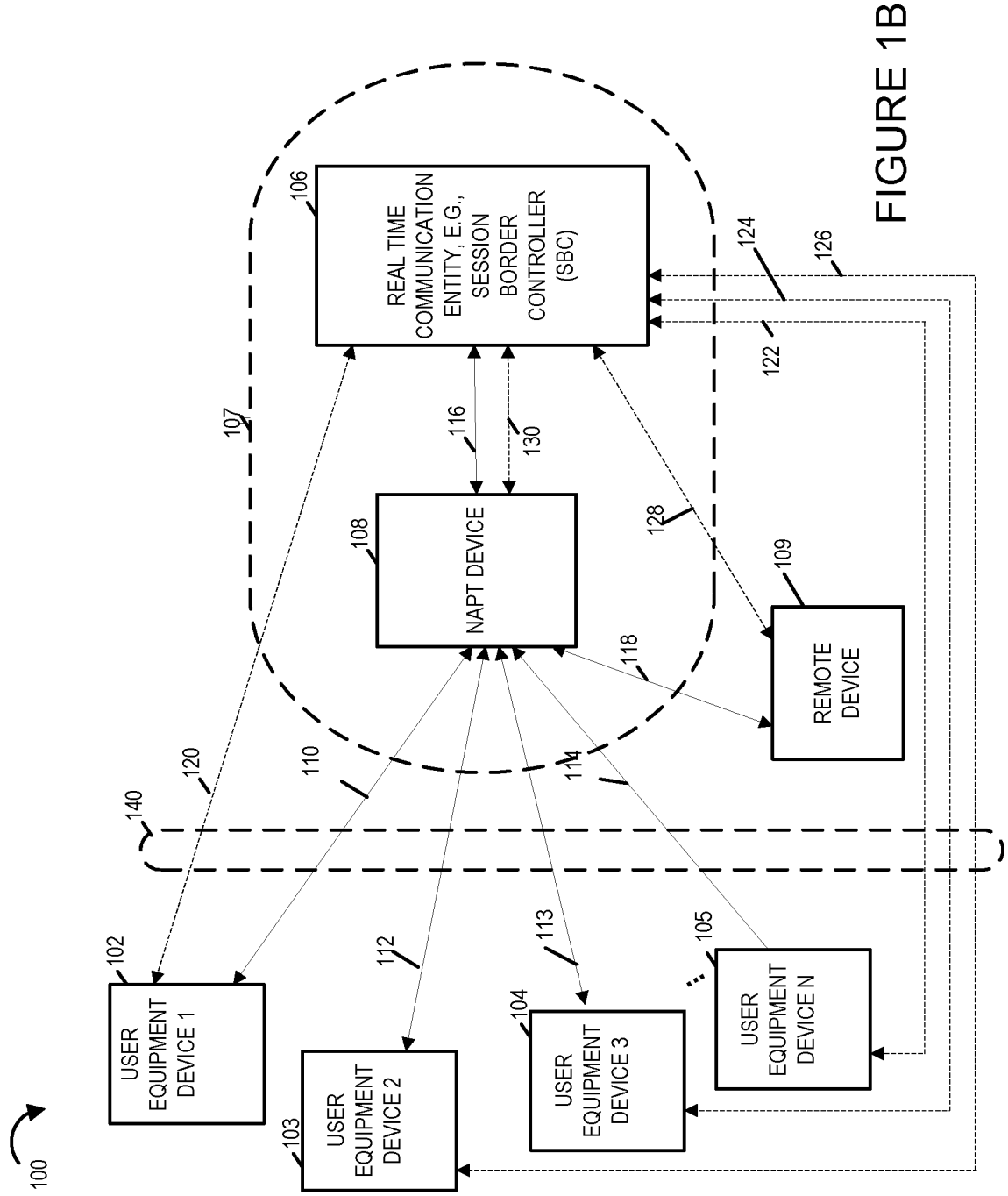
FIG. 1B illustrates a communications systems in accordance with an exemplary embodiment of the present invention.

FIG. 1B illustrates an exemplary communications system 100 in accordance with an exemplary embodiment. Communications system 100 includes a plurality of user equipment (UE) devices, a remote device 109, and network elements including a real-time communication entity 106, e.g. a network device illustrated in FIG. 1B as session border controller (SBC) 106, and a Network Address and Port Translation (NAPT) device 108. In some embodiments, the remote device 109 is a network device. In some embodiments the remote device 109 is a user equipment device. In some embodiments, the real-time communications entity 106 and NAPT device 108 are located in the cloud or on the Internet. The real-time communications entity 106 and NAPT device 108 are located in the same network domain. The real-time communication entity/device 106 which is illustrated as an SBC and the NAPT device 108 may be, and in some embodiments are, logical devices implemented on network equipment such as for example a computer. In some embodiments, the real-time communications entity 106 and/or NAPT device 108 are cloud based or cloud deployed entities. The optional network 107 shown in FIG. 1B in most but not all embodiments is the Internet or the cloud. In some embodiments, the real-time communications entity 106 and/or NAPT device 108 are separate logical entities which reside on the same physical device such as for example a computer which in some embodiments is located in the cloud. In some embodiments, the real-time communications entity 106 is a SBC implemented as a virtual machine running on a computer located in the cloud or Internet. In some embodiments, the NAPT device 108 is implemented as a virtual machine running on a computer located in the cloud or Internet. The plurality of user equipment (UE) devices include user equipment device 1 (UE 1) 102, user equipment device 2 (UE 2) 103, user equipment device 3 (UE 2) 103, . . . , user equipment device N (UE N) 105. Each user equipment device may be e.g., a mobile or stationary communications device, such as a cellular phone, fixed wired phone, smartphone, tablet device, laptop computer or other communications device. In this example, the user equipment devices, real-time communications entity 106, NAPT device 108 and remote device 109 support Session Initiation Protocol (SIP) signaling and are capable of communicating over an IP network such as the Internet. In the exemplary embodiment of FIG. 1B, the NAPT device 108 and real time communication device 106 also communicate over communication link 116 using a proprietary signaling protocol or a Software Defined Network signaling protocol such as for example Openflow with proprietary extensions. In some embodiments, the user equipment devices, SBC 106, NAPT device 109 and remote device 109 may support and communicate using other protocols with similar characteristics to SIP. In various embodiments various user devices such as the ones shown in FIG. 1B include a SIP user agent.

In some embodiments the communications system 100 includes a network 140 including various network devices for example, Network Address Translators and Network Address and Port Translators, through which signaling and media must traverse to reach the real-time communication device 106. The UE devices UE 1 102, UE 2 103, . . . , and UE N 105 are coupled to the public interface of the NAPT device 108 via communication links 110, 112, 113, . . . , 114 respectively. The UE devices UE 1 102, UE 2 103, . . . , and UE N 105 are coupled to the public interface of the real time communication entity 106 via communication links 120, 122, 125, . . . , 126 respectively. The communications links 120, 122, 125, . . . , 126 are used for communicating and exchanging control signals and information. In various embodiments the UE devices and the NAPT device 106 communicate and exchange information over a communications network formed by the communications links 110, 112, 113, . . . , 114. The network communications entity 106 and NAPT device 108 communicate over communications links 116 and 130 which may be an Internet Protocol network. Communications link 116 is used for communicating and exchanging data while communications link 130 is used for communicating and exchanging control information and signals. The NAPT device 108 and the remote device 109 communicate over communications link 118 which in some embodiments is the Internet. The User Equipment devices 102, 103, 104, . . . , 105 and the remote device 109 communicate with the real time communication entity via the NAPT device 108 when exchanging data such as for example media of a RTP packet stream. The UE devices and the remote device 109 are coupled to the public address side of the NAPT device 108 while the real time communication device 106 is connected to the private address side of the NAPT device 108. In some embodiments, the remote device 109 is a network device such as for example a SBC. In some embodiments, the remote device 109 is a user equipment device similar to the user equipment device 1 UE 1 102. In some embodiments, the NAPT device 108 is also a IP multiplexing device.

Figure 2:
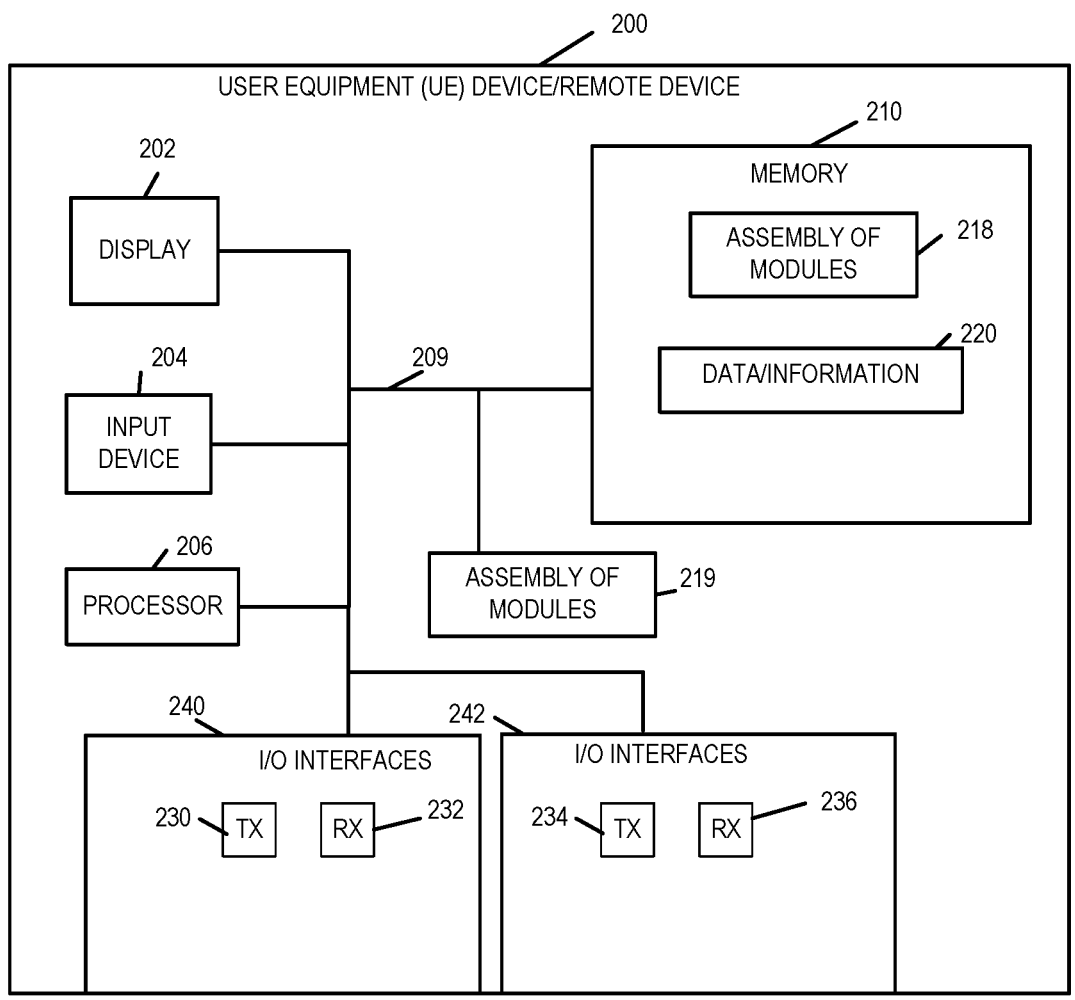
FIG. 2 illustrates an exemplary embodiment of a user equipment (UE) device/remote device in accordance with one embodiment of the present invention.

FIG. 2 illustrates an exemplary embodiment of a User Equipment (UE) device in accordance with one embodiment of the present invention. FIG. 2 also illustrates an exemplary embodiment of a remote device such as remote device 109 in accordance with one embodiment of the present invention. Exemplary user equipment device/remote device 200 includes a display 202, an input device 204, a processor 206, e.g., a CPU, input/output (I/O) interfaces 240 and 242, which couple the UE to a core network or various other devices including e.g. real-time communication entity 106, memory 210, and an assembly of modules 219, e.g., circuits corresponding to different modules, coupled together via a bus 209 over which the various elements may interchange data and information. Memory 210 includes an assembly of modules 218, e.g., an assembly of software modules, and data/information 220. The I/O interface 240 includes transmitters 230 and receivers 232. The I/O interface 242 includes transmitters 234 and receivers 236. The user equipment device is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP) and Session Description Protocol (SDP). In some embodiments, the UE 200 includes a communication module configured to operate using IP, TCP, UDP and SIP protocol signaling methods. In some embodiments, the communication module is a hardware module, a software module or a module including hardware and software components. In some embodiments, the user equipment devices UE 1, UE 2, UE 3, . . . , UE N of FIG. 1B are implemented in accordance with user equipment device/remote device 200 of FIG. 2. In some embodiments, the remote device 109 of FIG. 1B is implemented in accordance with user equipment device user equipment device/remote device 200 of FIG. 2.

Figure 3:
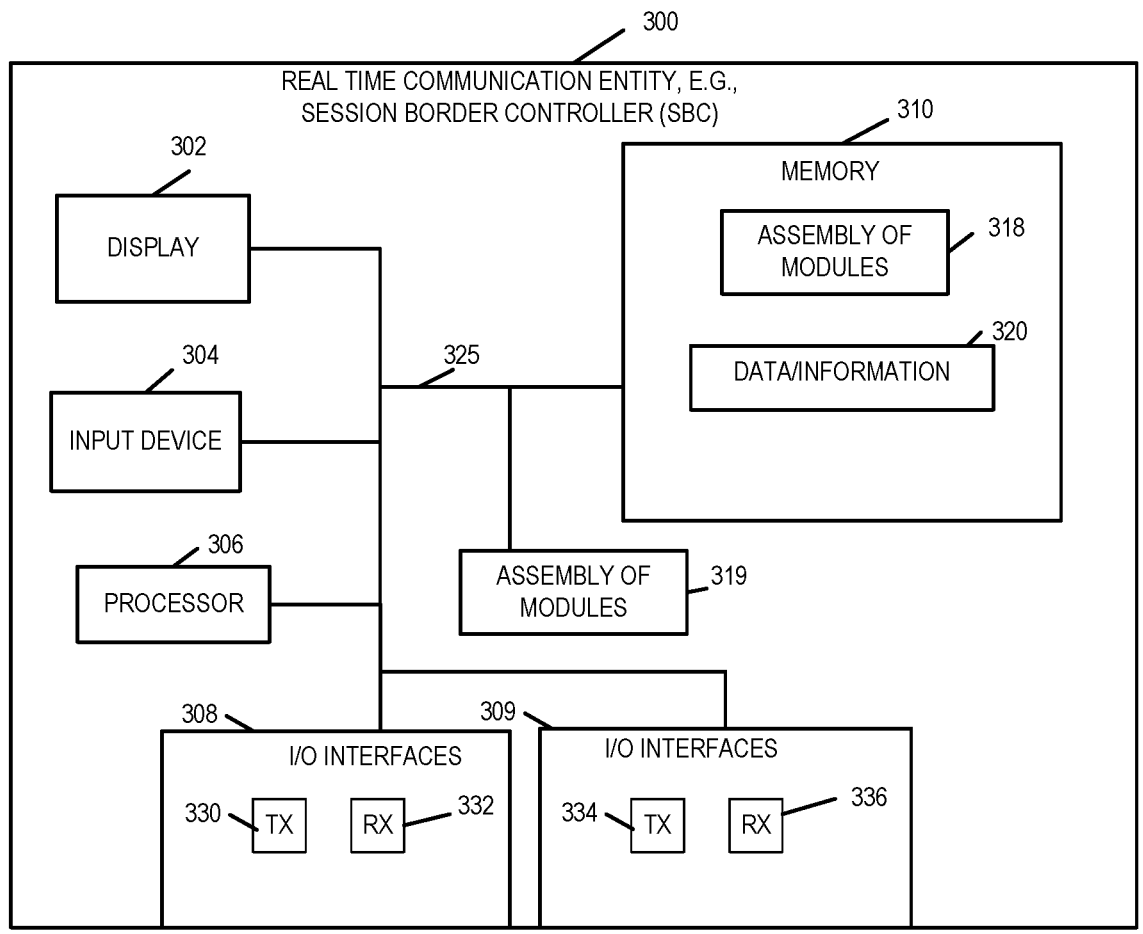
FIG. 3 illustrates an exemplary real time communication entity illustrated as a session border controller in accordance with one embodiment of the present invention.

FIG. 3 illustrates an exemplary embodiment of a real-time communication entity/device 300, e.g., a Session Border Controller (SBC) in accordance with one embodiment of the present invention.). The Real-time communication entity/device 300 is sometimes referred to hereinafter as Session Border Controller 300.

Exemplary session border controller 300 includes a display 302, an input device 304, a processor 306, e.g., a CPU, input/output (I/O) interfaces 308 and 309, which couple the SBC to a core network or various other devices including NAPT device 108 and User Equipment devices, memory 310, and an assembly of modules 319, e.g., circuits corresponding to different modules, coupled together via a bus 325 over which the various elements may interchange data and information. Memory 310 includes an assembly of modules 318, e.g., an assembly of software modules, and data/information 320. The I/O interfaces 308 include transmitters 330 and receivers 332. The I/O interfaces 309 includes transmitters 334 and receivers 336. The real-time communications entity is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. In some embodiments, a single public IP address/port pair is used for all signaling, e.g., SIP signaling relating to establishing sessions. In most, but not all embodiments, the IP/port number pairs used for media sessions are private IP/port number pairs. The signaling IP/port number pair for establishing the session being different from the IP/port number pair used for communicating media of a media session.

The I/O interfaces in some embodiments are configured to communicate in accordance with the IP, Transport Control Protocol (TCP), User Datagram Protocol (UDP), Session Initiation Protocol (SIP) Session Description Protocol (SDP), Openflow protocol and/or one or more proprietary signaling protocols. In some embodiments, the SBC 300 includes a communication module configured to operate using one or more IP, TCP, UDP, SIP, SDP, Openflow and/or proprietary protocol methods. In some embodiments, the communication module is a hardware module, a software module or a module including hardware and software components. In some embodiments, the real-time communication entity 106 of FIG. 1B is SBC 300 of FIG. 3. In some embodiments, the real-time communication entity 106 is implemented as a virtual machine operating on a computing device in the cloud.

Figure 4:
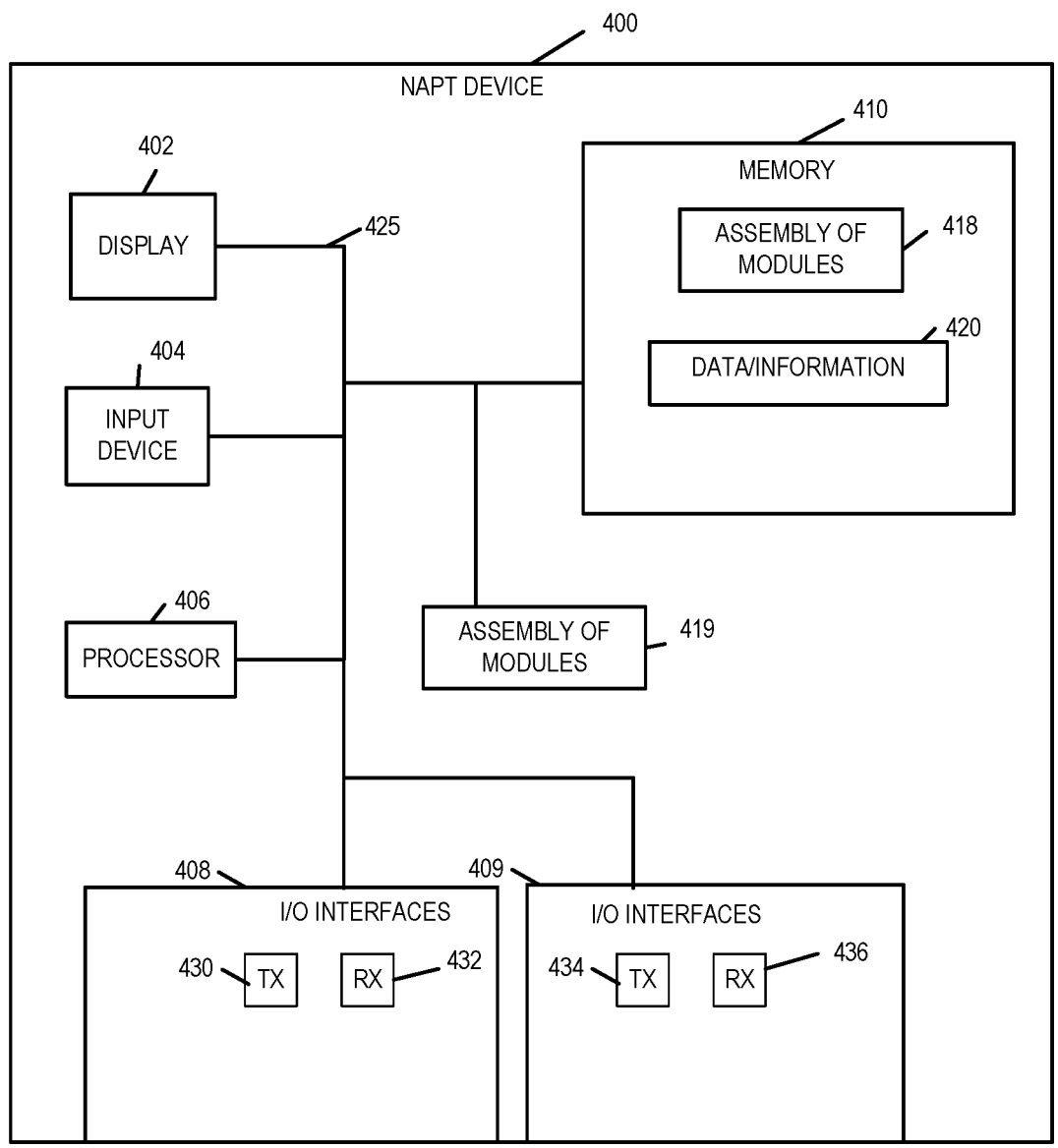
FIG. 4 illustrates a Network Address and Port Translation entity/device in accordance with one embodiment of the present invention.

FIG. 4 illustrates an exemplary embodiment of a Network Address and Port Translation device in accordance with one embodiment of the present invention. Exemplary NAPT device 400 includes a display 402, an input device 404, a processor 406, e.g., a CPU, input/output (I/O) interfaces 408 and 409, which couple the NAPT device to a core network or various other devices including for example remote devices, SBC devices, other NAPT devices, and User Equipment, memory 410, and an assembly of modules 419, e.g., circuits corresponding to different modules, coupled together via a bus 425 over which the various elements may interchange data and information. Memory 410 includes an assembly of modules 418, e.g., an assembly of software modules, and data/information 420. The I/O interfaces 408 include transmitters 430 and receivers 432. The I/O interfaces 409 include transmitters 430 and receivers 432. The NAPT device is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Protocol Packets of a media session. The NAT has a plurality of public IP/port number pairs as well as private IP/port number pairs used for media sessions.

The I/O interfaces in some embodiments are configured to communicate in accordance with the Internet Protocol, Transport Control Protocol, User Datagram Protocol (UDP), Session Initiation Protocol (SIP), Session Description Protocol (SDP), Openflow protocol and/or one or more proprietary protocols. In some embodiments, the NAPT device 400 includes a communication module configured to operate using IP, TCP, UDP, SIP, SDP, Openflow protocol methods. In some embodiments, the communication module is a hardware module, a software module or a module including hardware and software components. In some embodiments, the NAPT device 108 of FIG. 1B is implemented in accordance with NAPT device 400. In some embodiments, the NAPT device is implemented on hardware such as computer hardware which is deployed in the cloud. In some embodiments, the NAPT device 400 is implemented as a virtual machine on computer hardware which may be deployed in the cloud or on the Internet.

Figure 5:
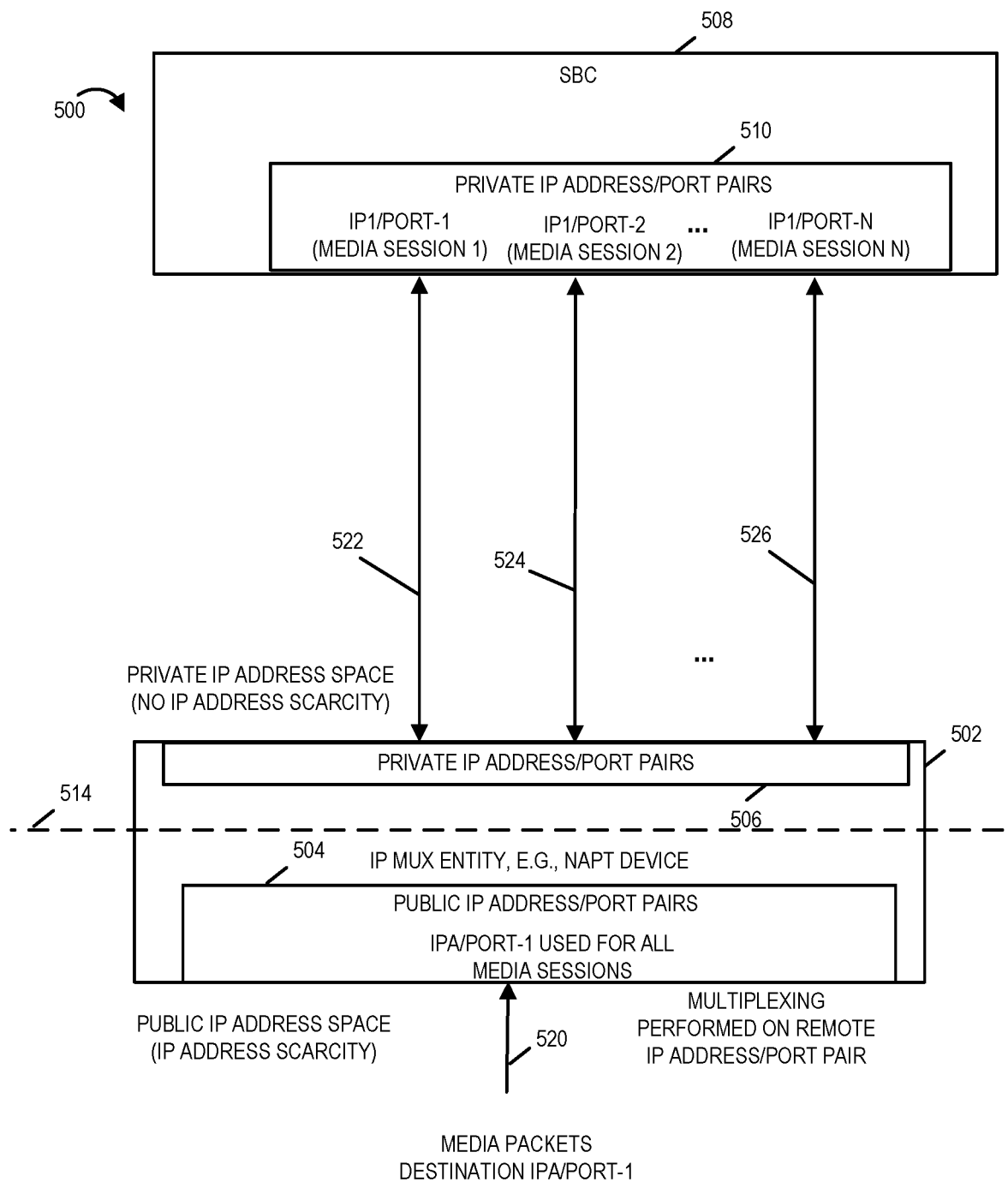
FIG. 5 illustrates a system in accordance with an embodiment of the present invention.

Communications system 500 of FIG. 5 illustrates another exemplary embodiment. Communications system 500 includes Internet Protocol multiplexing entity (IP MUX entity) 502 and SBC 508. The IP MUX entity 502 may be, and in some embodiments is a NAPT device. In some embodiments, the IP MUX entity 502 is implemented in accordance with the NAPT device 400 of FIG. 4. The SBC 508 may be, and in some embodiments is implemented in accordance with the real-time communications entity 300 of FIG. 3.

Line 514 shows how the communications system is divided into a public IP address space (below the line) and a private IP address space (above the line). The IP MUX 502 in this embodiment is a NAPT device that performs a translation of the IP address and port from the public IP address/port to a private IP address/port. The SBC 508 and IP MUX entity 502 are in the same IP domain and share the same IP address space over which they can communicate and exchange information such as media packets of a media session. There is no issue regarding the scarcity of IP addresses in the private IP address. There is a scarcity of IP addresses in the pubic IP address and the communications system 500 employs an efficient method of allocating and using public IP address/port pairs to conserve IP addresses.

The IP Multiplexer 502 includes public IP address/port pairs 504 and Private IP address/port pairs 506. While only one exemplary public IP address/port pair (IPA/port-1) is shown in the public IP address/port pairs element 504 for the sake of simplicity in explaining the invention, the IP Multiplexer typically includes a plurality of public IP address/port pairs.

SBC 508 includes private IP address/port pairs 510 which includes private IP1/port-1, IP1/port-2, . . . , IP1/port-N. These N IP address/port pairs are allocated in the private IP address space where there is not a scarcity IP address problem.

An example of how the system works is now explained. Media packets 520 with a destination of IPA/port-1 are received at the public IP address/port pair IPA/port-1 of the IP MUX 502. Each of the media packets will include a remote IP address/port from which the media packet was received corresponding to the remote device IP address/port that sent the packet. Each media session will have a different remote device IP address/port from which the packet was received. The IP multiplexer 502 includes a mapping translation table such as for example shown in FIG. 8 which maps remote IP address/port pairs to SBC private IP address/port pairs. The IP MUX 502 uses this mapping table to determine to which SBC private IP address/port pair the received media packet is to be routed based on matching the IP address/port pair from which the media packet was sent to a remote IP address/port pair. Once a match is found the table provides the SBC private IP address/port pair to which the media packet is to be sent. There will be one remote IP address/port pair for each of the media sessions 1, 2, . . . , N. In this way, one public IP address/port IPA/port-1 is used for all media sessions 1, 2, . . . , N. Media 522 are the media packets determined to be for media session 1, media 524 are the media packets determined to be for media session 2, . . . , media 526 are those packets which are for media session N. While the multiplexing has been discussed in terms of routing media packets for different media sessions to the corresponding SBC private IP address/port pairs, the IP MUX 502 also receives and sends media packets from the SBC 508 to the various remote IP address/port pairs of the corresponding remote device for the media session.

In addition to performing the mapping of the remote IP address/port to a local private SBC IP address/port, the system 506 can also conserve public IP address/port space by implementing the signaling method 6000 described in connection with FIG. 6.

Figure 6:
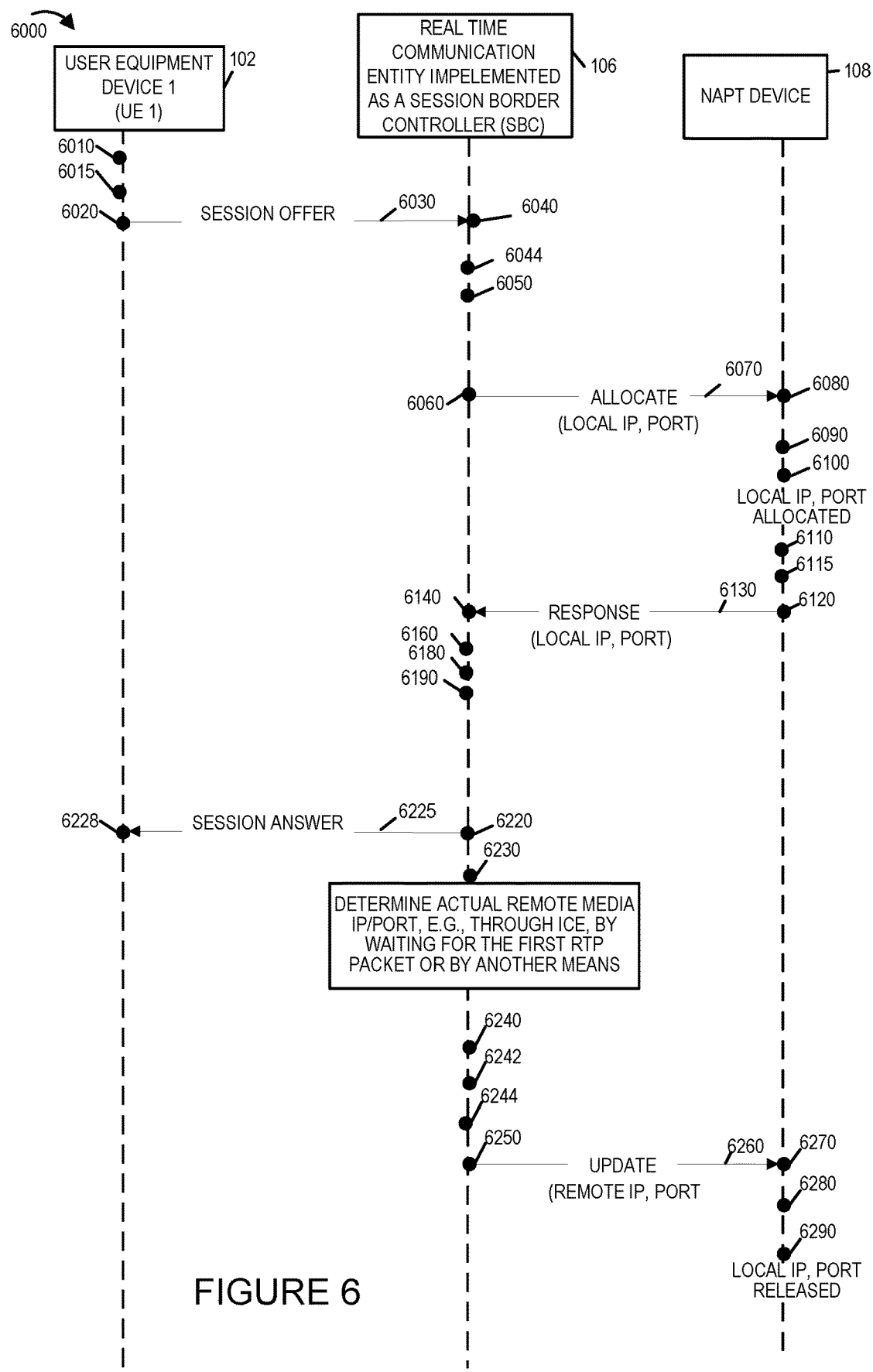
FIG. 6 illustrating the steps and associated signaling exchange between various entities/devices performed in an exemplary communications method in accordance with one exemplary embodiment of the present invention.

An exemplary communications method to efficiently and economically manage the use of routable IP addresses is illustrated in diagram 6000 of FIG. 6 along with the signaling used to implement the method. In FIG. 6, the exemplary method 6000 is implemented using exemplary system 100 of FIG. 1B. The method 6000 may be, and in some embodiments is, used as an application assisted efficient NAPT binding management method for SIP based communications systems. Elements or steps with the same reference numbers used in different figures are the same or similar and those elements or steps will not be described in detail again.

The method 6000 will now be explained in connection with the steps of the signaling diagram shown in FIG. 6. For explanatory purposes simplified SIP request and response messages are depicted with the messages and information contained therein illustrated which are most pertinent to explaining the present embodiment of the invention. As it will be appreciated additional information and formatting of the messages as well as the use of additional messages may be and typically is used in initiating and communicating among entities using SIP such for example initiating a Voice Over Internet Protocol call session and establishing a media session between UE 1 102 and the real time communication system implemented as an SBC 106.

Method 6000 begins in start step 6010. Operation proceeds from start step 6010 to step 6015. In step 6015, user equipment device 1 (UE 1) 102 generates a SIP message 6030 including a session offer. The session offer message identifies one or more media streams which are components of the session. The UE 1 102 may, and in some embodiments does, generate the SIP message 6030 in response to detecting user input indicating that a user of UE1 102 wishes to establish a communications session including a media session such as for example a Voice Over Internet Protocol call. The session offer identifies the media type(s) and an IP address and port number pair on the UE1 device to be used for the one or more media streams of the session or a number of candidate addresses to be used for each of the one or media streams of the session for example in accordance with ICE procedures. For example, the SIP message 6030 may be a SIP Invite message including a Session Description Protocol offer message included in the SIP Invite message. Operation proceeds from step 6015 to step 6020. In step 6020, the UE 1 device 102 sends the SIP message 6030 including the session offer to the Session Border Controller (SBC) 106. Operation proceeds from step 6020 to step 6040.

In step 6040 SBC 106 receives the session offer message 6030. Operation proceeds from step 6040 to step 6044. In step 6044, SBC 106 processes the session offer message 6030. The actual remote IP address/port number pair of UE 1 102 to be used for the session is not known to the SBC 106 at this time. This may be so for a number of reasons including that a number of different candidate IP address/port pairs have been included in the media session offer in accordance with ICE procedures and/or the IP address/port pairs in the session offer are private addresses or addresses which have been modified in transit to the SBC for example by NAPTs. The SBC 106 determines based on the received session offer to request the allocation of a local public IP address and port pair be allocated for one or more media streams identified in the session offer. Operation proceeds from step 6044 to step 6050.

In step 6050, SBC 106 generates a signal 6070 requesting the allocation of a local public IP address and port pair which will be reserved for media session. In some embodiments, the signal 6070 is an allocate message requesting the allocation of a local public IP address and port pair. In some embodiments, the allocate message is a proprietary message. In some embodiments, the signal 6070 is a Software Defined Network (SDN) protocol message with a proprietary extension wherein the proprietary extension includes the request for the allocation of the local public IP address and port pair. In some embodiments, the SDN protocol is the OpenFlow protocol. Operation proceeds from step 6050 to step 6060.

In step 6060, SBC 106 transmits the signal 6070 requesting the allocation of the local public IP address port pair to NAPT device 108. Operation proceeds from step 6060 to step 6080. In step 6080, NAPT device 106 receives the signal 6070 requesting the allocation of the local public IP address and port pair. Operation proceeds from step 6080 to step 6090. In step 6090, the NAPT device 106 processes the signal 6070 and determines that the SBC 106 is requesting the allocation of a local public IP address/port pair. Operation proceeds from step 6090 to step 6100. In step 6100, the NAPT device 108 allocates a public local IP address/port pair, for example, from a pool of public local IP address/port pairs available to the NAPT device 108. Operation proceeds from step 6100 to step 6110. In step 6110, the NAPT device 106 updates a record stored in memory tracking the allocation and/or availability of local public IP address/port pairs in the pool of local public IP address/port pairs available to the NAPT device 108. The NAPT device 108 identifies in the record that the allocated public local IP address/port pair as being allocated to the SBC 106 as the destination IP address/port pair for the media of the session offer corresponding to session offer 6030. The NAPT device 108 removes the allocated public local IP address/port pair from the pool of available public local IP address/port pairs. Operation proceeds from step 6110 to step 6115.

In step 6115, the NAPT device 108 generates a response message 6130 in response to the signal 6070 requesting the allocation of the local public IP address/port pair. The response message 6130 includes the public local IP address/port pair allocated by the NAPT device 108 in response to the request signal 6070 received from the SBC 106. In some embodiments, the response message is a proprietary protocol message. In some embodiments, the response message is a SDN protocol message including a proprietary extension in which the allocated IP address and port pair number are included. In some embodiments, the SDN protocol is the OpenFlow protocol. Operation proceeds from step 6115 to step 6120. In step 6120, the NAPT device 108 sends or transmits the response message 6130 to the SBC 106. Operation proceeds from step 6120 to step 6140.

In step 6140, the SBC 106 receives the response message 6130. Operation proceeds from step 6140 to step 6160. In step 6160, the SBC 106 processes the received response message 6130 and determines the local public IP address and port number pair allocated by the NAPT device 108. The allocated local public IP address and port number is a public IP address and port number located in the I/O interface of the NAPT device 108. Operation proceeds from step 6160 to step 6180.

In step 6180, SBC 106 stores in the data/information 320 portion of its memory 310 a record in which the NAPT local destination IP address/port pair to be used for sending and receiving media for the communication session requested by UE 1 102 in the session offer 6030 corresponds to the allocated public local IP address/port pair. Operation proceeds from step 6180 to step 6190.

In step 6190, the SBC 106 generates a session offer response message 6225. The session offer response message may be a SDP answer message included in a SIP response message such as a SIP 200 message. The answer message, e.g., SDP answer message identifies the allocated local pubic IP address and port number as the destination IP address and port number to which media packets for the one or more media streams of the proposed session are to be sent by the UE 1 102 when sending media packets of the proposed communication session to the SBC 106. Operation proceeds from step 6190 to step 6220.

In step 6220, the SBC 106 sends or transmits the session answer message 6225 to the UE 1 device 102. Operation proceeds from step 6220 to step 6228. In step 6228, the UE 1 102 receives and processes the session answer message 6225. Operation proceeds from step 6228 to step 6230.

In step 6230 the SBC 106 determines the actual remote media IP address and port number pair to be used as the destination IP address/port number pair when the SBC 106 is transmitting or sending media packets to the UE 1 102 as part of the communication session. In some embodiments, the SBC 106 makes this determination through the use of the Interactive Connectivity Establishment (ICE) protocol method for example by identifying the destination IP address/port number pair from the first Real time Transport Packet Protocol (RTP) media packet received or by another means. Operation proceeds from step 6230 to step 6240.

In step 6240, the SBC 106 updates the record stored in its memory 310 to include the actual remote IP address/port pair corresponding to the IP address/port pair number of the UE 102 device for the communication session. Operation proceeds from step 6240 to step 6242.

In step 6242, upon determining that the actual remote media IP address/port pair, the SBC 106 makes a decision to update the NAPT device 108 with respect to the actual remote media IP address/port number pair for the at least one media stream of the communication session. Operation proceeds from step 6242 to step 6244. In step 6244, SBC 106 generates an update signal 6260 which may be, and in some embodiments is a, message including the actual remote IP address/port number pair corresponding to the communication session. In some embodiments, the update signal 6260 is a proprietary message. In some embodiments, the update signal 6260 is a SDN message including a proprietary extension in which the actual remote IP address/port number pair is included along with information identifying the communication session and/or the media stream of the communication session. In some such embodiments, the SDN protocol is the OpenFlow protocol. The operation proceeds from step 6244 to step 6250.

In step 6250, the SBC 106 sends or transmits the update signal 6260 to the NAPT device 108. Operation proceeds from step 6250 to step 6270. In step 6270, the NAPT device 108 receives the SIP Update signal 6260. Operation proceeds from step 6270 to step 6280.

In step 6280, the NAPT device 108 processes the received Update signal 6260 and determines the actual remote IP address/port pair for the media of the communication session corresponding to the allocated local public IP address/port pair. Operation proceeds from step 6280 to step 6290.

In step 6290, the NAPT device 108 releases the local public IP address/port pair placing it back in the pool of available local public IP address/port pair numbers that are allocatable. Operation proceeds from step 6290 to step 6300. In step 6300, NAPT device 108 updates its record in memory regarding the local public IP address/port pair indicating that the local IP address/port pair is no longer reserved but is available for allocation and identifying the actual remote IP address/port number pair as corresponding to the UE 1 102 destination IP address and port number pair for media packets corresponding to the communication session.

Figures 7, 7A, 7B, 7C:
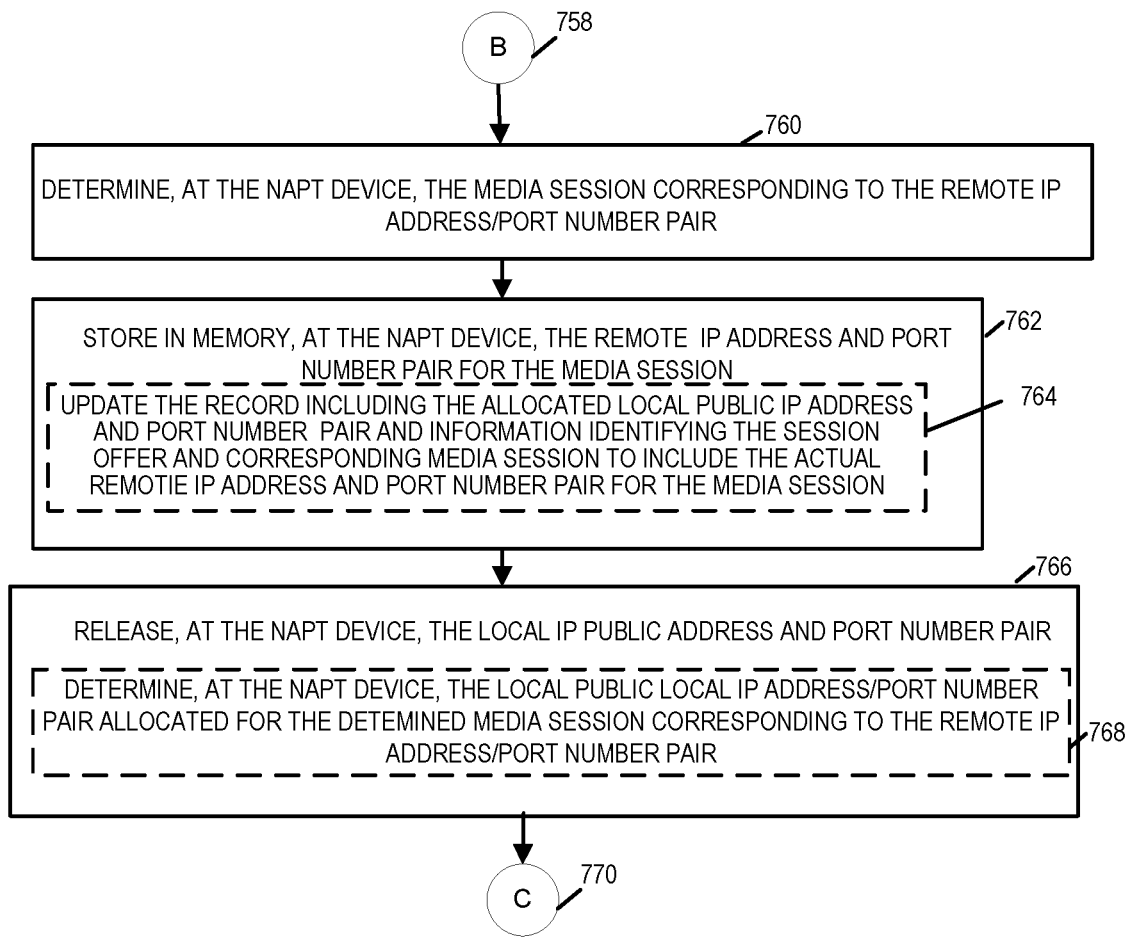
FIG. 7 illustrates the combination of FIGS. 7A, 7B and 7C.
FIG. 7A illustrates a first part of a flowchart showing the steps of an exemplary communications method in accordance with one embodiment of the present invention.
FIG. 7B illustrates a second part of a flowchart showing the steps of the exemplary communications method in accordance with one embodiment of the present invention.
FIG. 7C illustrates a third part of a flowchart showing the steps of the exemplary communications method in accordance with one embodiment of the present invention.
Figure 7A:
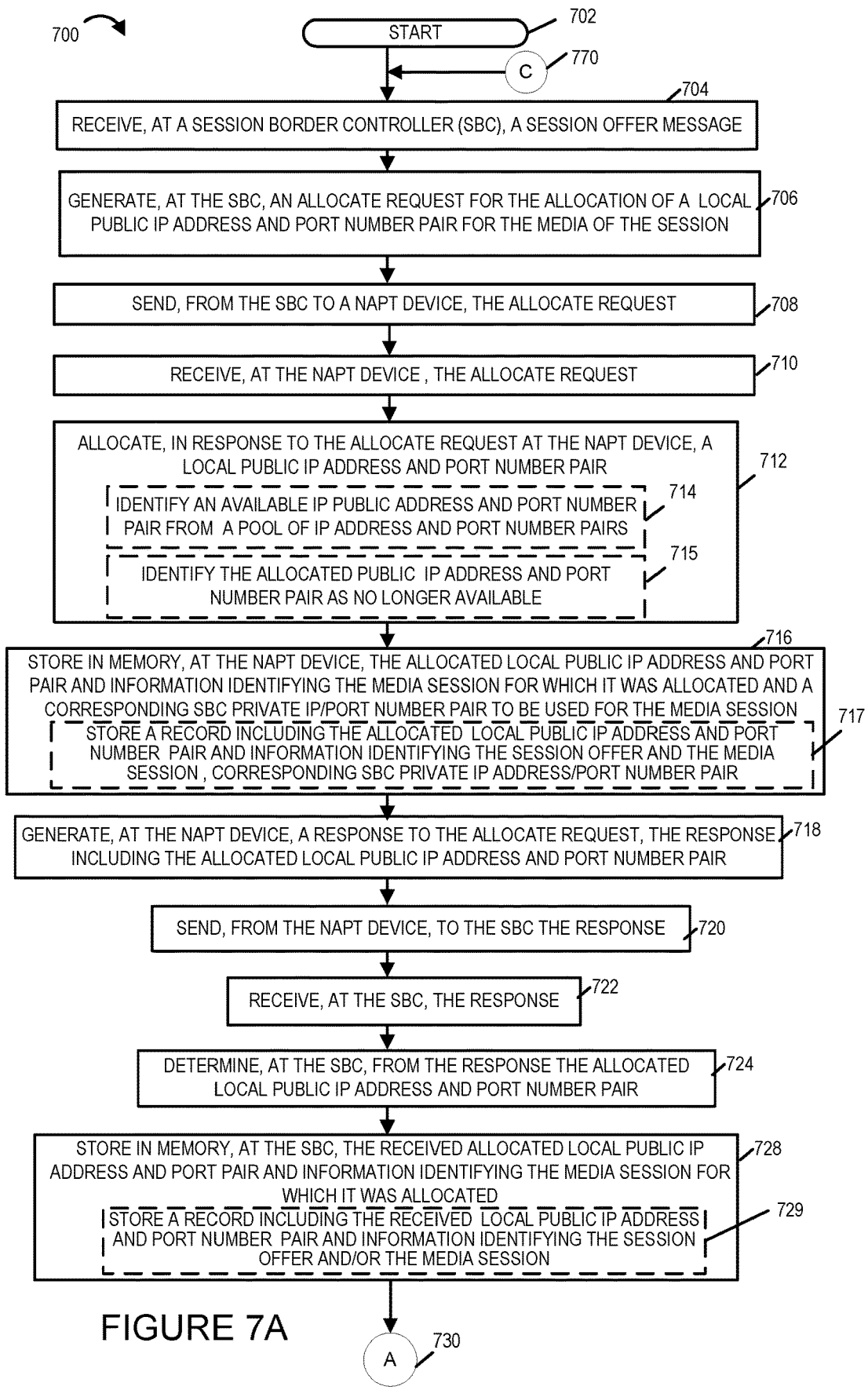
Figure 7B:
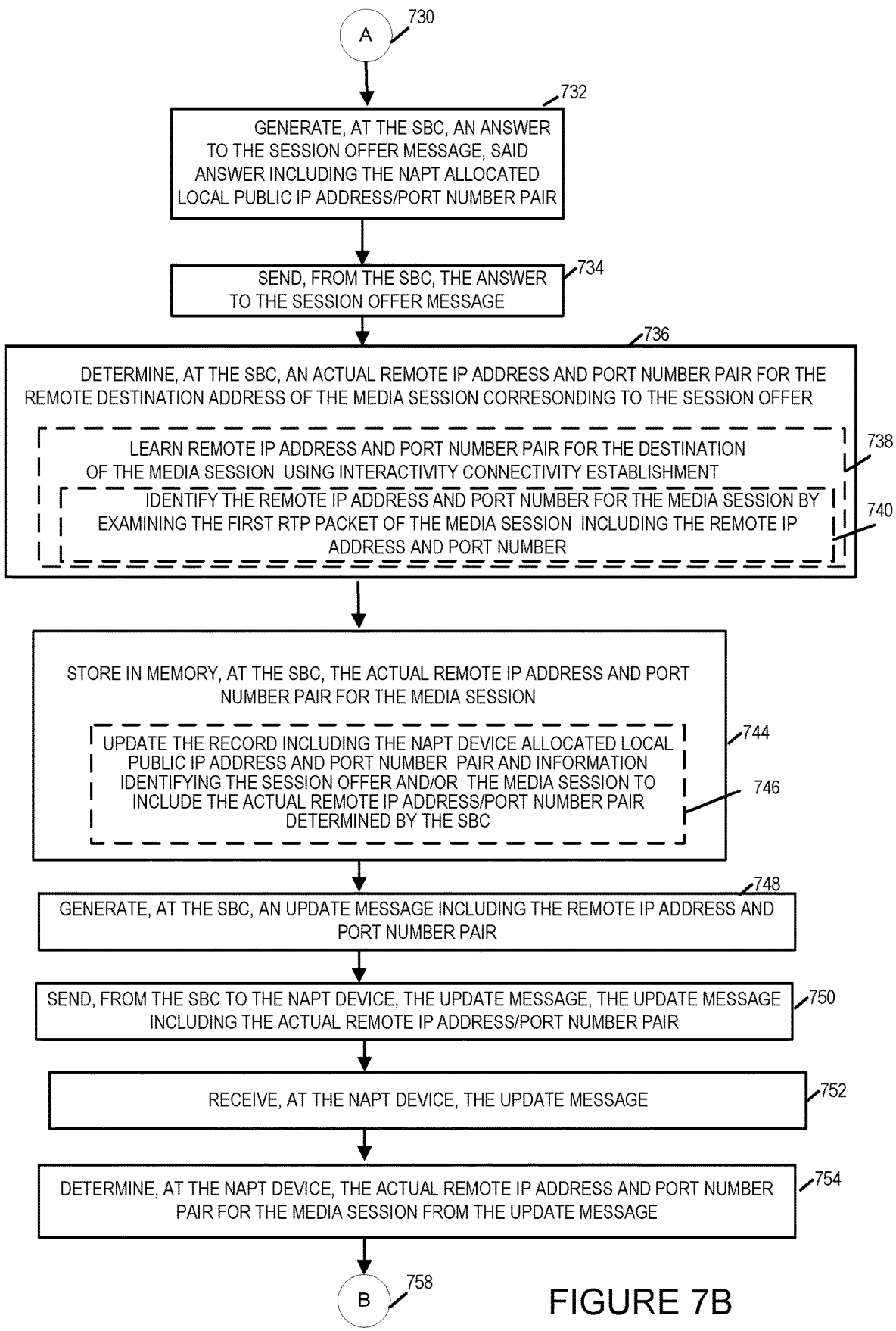

FIG. 7 illustrates the combination of FIGS. 7A, 7B and 7C. FIG. 7A illustrates a first part of a flowchart showing the steps of an exemplary method of operating a communications system including a real time communication entity which is illustrated as a Session Border Controller (SBC) and a NAPT device in accordance with one embodiment of the present invention. FIG. 7B illustrates a second part of the flowchart showing the steps of the exemplary method of operating a communications system in accordance with one embodiment of the present invention. FIG. 7C illustrates a third part of the flowchart showing the steps of the exemplary method of operating a communications system in accordance with one embodiment of the present invention. For exemplary purposes the method 700 is explained as implemented on the communications system 100 of FIG. 1B.

The method 700 commences in start step 702. Operation proceeds from start step 702 to step 704. In step 704, a session offer message is received at the SBC. The session offer message identifies a media stream, e.g., an audio stream, which is to be part of the communication session. In some embodiments, the session offer is a SIP INVITE message including a SDP offer message. Operation proceeds from step 704 to step 706.

In step 706, an allocate request for the allocation of a local public IP address and port number pair for the media stream of the communication session identified in the session offer is generated. In some embodiments, the allocate request is a proprietary message or proprietary extension to standard protocol signal message. Operation proceeds from step 706 to step 708.

In step 708, the allocate request is sent from the SBC to a NAPT device. In some embodiments, the allocate request is sent from the SBC to a NAPT device over a private communication channel. Operation proceeds from step 708 to step 710. In step 710, the allocate request is received at the NAPT device. Operation proceeds from step 710 to step 712.

In step 712, at the NAPT device in response to the received allocation request from the SBC, a local public IP address and port number pair is allocated. In some embodiments step 712 includes optional sub-steps 714 and 715. In sub-step 715, the NAPT device identifies an available local public IP address and port number pair from a pool of public IP address and port number pairs. In sub-step 715, the NAPT device identifies the public IP address and port number pair allocated by the NAPT in response to the SBC request as no longer available. Operation proceeds from step 712 to step 716.

In step 716, at the NAPT device the allocated local public IP address and port number pair and information identifying the media session for which it was allocated and a corresponding SBC private IP address/port number pair to be used for the media session by the SBC. In some embodiments step 716 includes sub-step 717. In sub-step 717, a record including the allocated local public IP address and port number pair and information identifying the media session offer and/or the media session and the corresponding SBC private IP address/port number pair is stored at the NAPT device.

In step 718, a response to the allocate request is generated wherein the response includes the allocated local public IP address and port number pair. In some embodiments, the response is a proprietary message. In some embodiments, the message includes an SDP message including the allocated local public IP address and port number pair which has been allocated. In some embodiments, the message is a SDN message including a proprietary extension in which the local public IP address and port number pair are included. In some embodiments, the SDN message is an Openflow message. Operation proceeds from step 718 to step 720.

In step 720, the response, e.g., a message including the allocated local public IP address and port number pair, is sent from the NAPT device to the SBC which sent the allocation request. Operation proceeds from step 720 to step 722.

In step 722, the SBC receives the response, e.g., the response message. Operation proceeds from step 722 to step 724. In step 724, the allocated local IP public address and port number pair allocated by the NAPT device is determined at the SBC from the response. Operation proceeds from step 724 to step 728.

In step 728, the allocated local public IP address and port number pair is stored in memory at the SBC along with information identifying the communication session and/or media stream for which it was allocated and a corresponding SBC private IP address/port number pair to be used by the SBC for the media session. In some embodiments, step 728 includes a sub-step 729. In sub-step 729, a record including the received local public IP address and port number pair and information identifying the session offer and/or the media session and corresponding SBC private IP address/port number pair is stored in memory at the SBC. Operation proceeds from step 728 to step 732 shown on FIG. 7B via connection node A 730.

In step 732, an answer to the session offer message is generated at the SBC, e.g., a SIP message including a SDP answer message. The answer includes the NAPT allocated local public IP address and port number pair identified as the destination for the media of the proposed communication session. Operation proceeds from step 732 to step 734. In step 734, the answer to the session offer message is sent or transmitted from the SBC to the entity from which the session offer message was received. Operation proceeds from step 734 to step 736.

In step 736 an actual remote IP address and port number pair for the destination address of the media for the session corresponding to the session offer is determined at the SBC. In some embodiments, step 736 includes sub-step 738. In sub-step 738, the remote IP address and port number pair for the destination of the media of the session is learned using the Interactivity Connection Establishment protocol. In some embodiments, sub-step 738 includes a sub-step 740. In sub-step 740, the remote IP address and port number pair for the media stream is identified by examining the first RTP packet which includes the actual remote IP address and port number pair for the media of the communication session. Operation proceeds from step 736 to step 744.

In step 744, the actual remote IP address and port number pair is stored in memory at the SBC with information identifying the communication session and corresponding media stream. Step 744 in some embodiments includes optional step 746. In step 746, the record including the NAPT allocated local public IP address and port number pair and information identifying the media session offer and/or the media session are updated to include the actual remote IP address/port number pair determined by the SBC. Operation proceeds from step 744 to step 748.

In step 748, an Update message, e.g., a proprietary or SDN message with a proprietary extension, including the actual remote IP address and port number pair is generated at the SBC. Operation proceeds from step 748 to step 750. In step 750, the generated Update message is sent or transmitted from the SBC to the NAPT device. Operation proceeds from step 750 to step 752.

In step 752, the update message is received at the NAPT device. Operation proceeds from step 752 to step 754. In step 754, the local public IP address and port number pair previously allocated in response to the SBC request is released. Operation proceeds from step 754 to step 760 shown on FIG. 7C via connection node B 758.

In step 760, the communication session and corresponding media stream corresponding to the remote IP address/port number pair received is determined. Operation proceeds from step 760 to step 762. In step 762, at the NAPT device the remote IP address and port number pair for the identified communication session media stream is stored in memory. In some embodiments, step 762 includes sub-step 764. In sub-step 764, the record including the allocated local public IP address and port number pair and information identifying the session offer and corresponding media communication session is updated to include the actual remote IP address and port number pair for the media communication session. Operation proceeds from step 762 to step 766.

In step 766, the local public IP address and port number pair is released at the NAPT device. When the local public IP address and port number pair is released the NAPT public IP address and port number pair are returned to the pool of available NAPT public IP address/port number pairs which may be used in response to allocation requests for new media session. While the NAPT public IP address and port number pair has been released it is still used being actively used for the media session. Incoming media packets received for the media session at the allocated NAPT IP address/port number pair are routed by the NAPT device to the corresponding SBC private IP address/port number based on the actual remote IP address/port number pair, i.e., the source IP address/port number pair of the sending device instead of based solely on the NAPT IP address/port number pair at which the media packets of the media session are received. In some embodiments, step 766 includes optional sub-step 768. In sub-step 768, the NAPT local public IP address and port number pair allocated for the determined communication media session corresponding to the remote IP address and port number pair is determined. Operation proceeds from step 768 to step 704 shown on FIG. 7A via connection node C 770 wherein the method 700 continues with the next received session offer message being received at the SBC.

Figures 8, 8A, 8B, 8C:
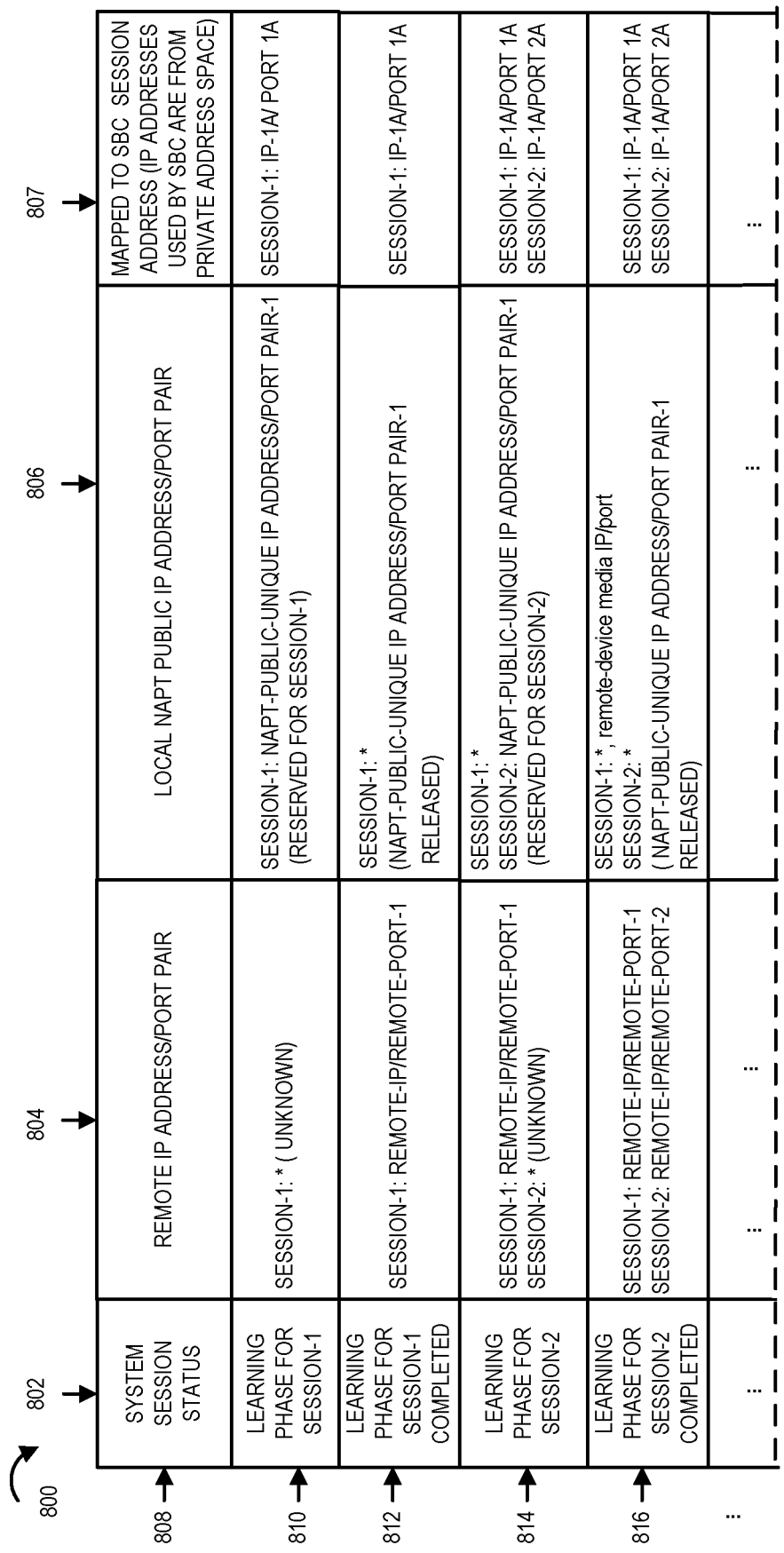
FIG. 8 illustrates the combination of FIGS. 8A, 8B and 8C.
FIG. 8A illustrates the first part of an exemplary table including information showing the usage of remote IP address/port pairs and local NAPT public IP address/port pairs for various exemplary phases of communications sessions in accordance with some embodiments of the invention.
FIG. 8B illustrates the second part of an exemplary table including information showing the usage of remote IP address/port pairs and local NAT public IP address/port pairs for various exemplary phases of communications sessions in accordance with some embodiments of the invention.
FIG. 8C illustrates the third part of an exemplary table including information showing the usage of remote IP address/port pairs and local NAT public IP address/port pairs for various exemplary phases of communications sessions in accordance with some embodiments of the invention.
Figure 8B:
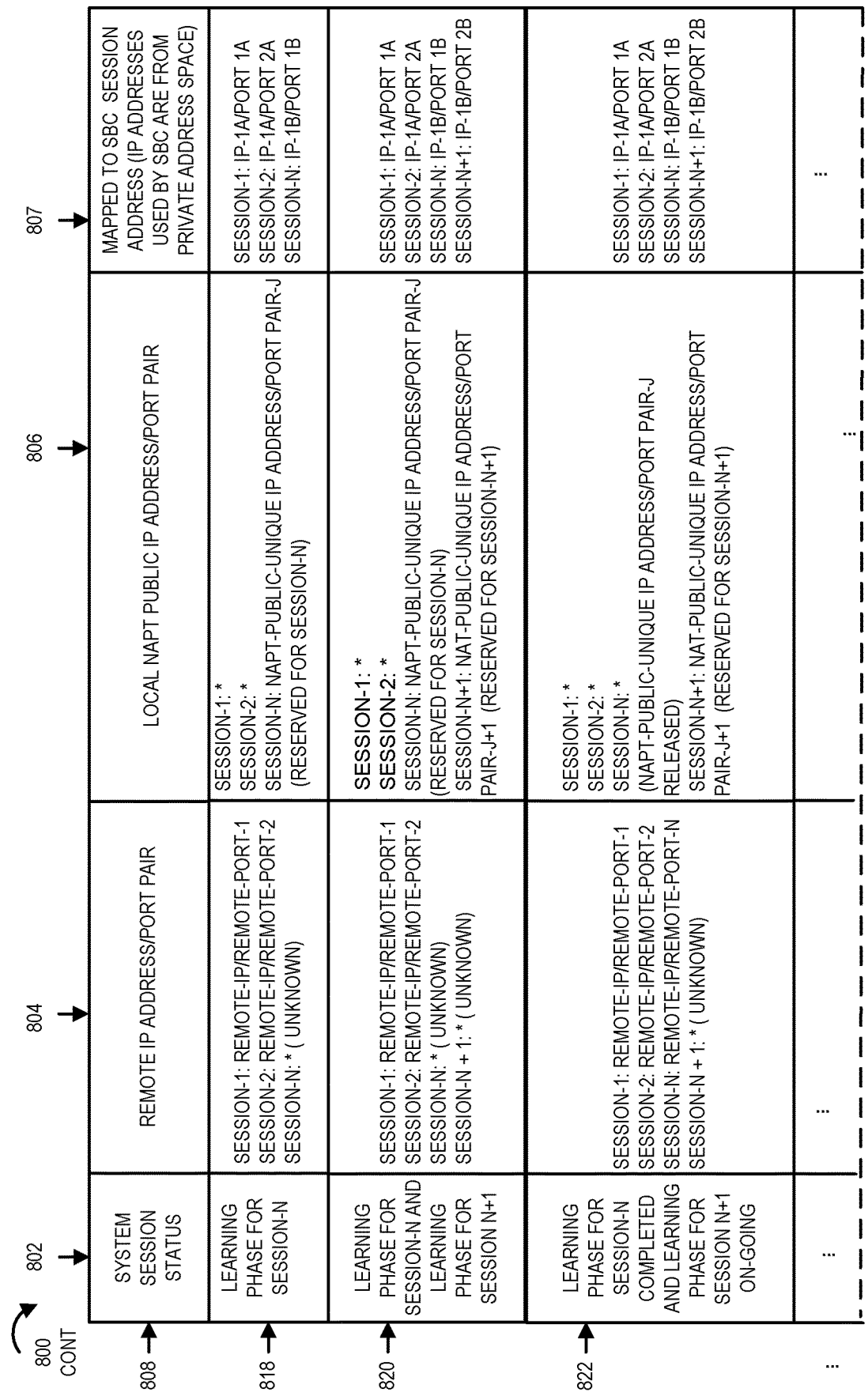
Figure 8C:
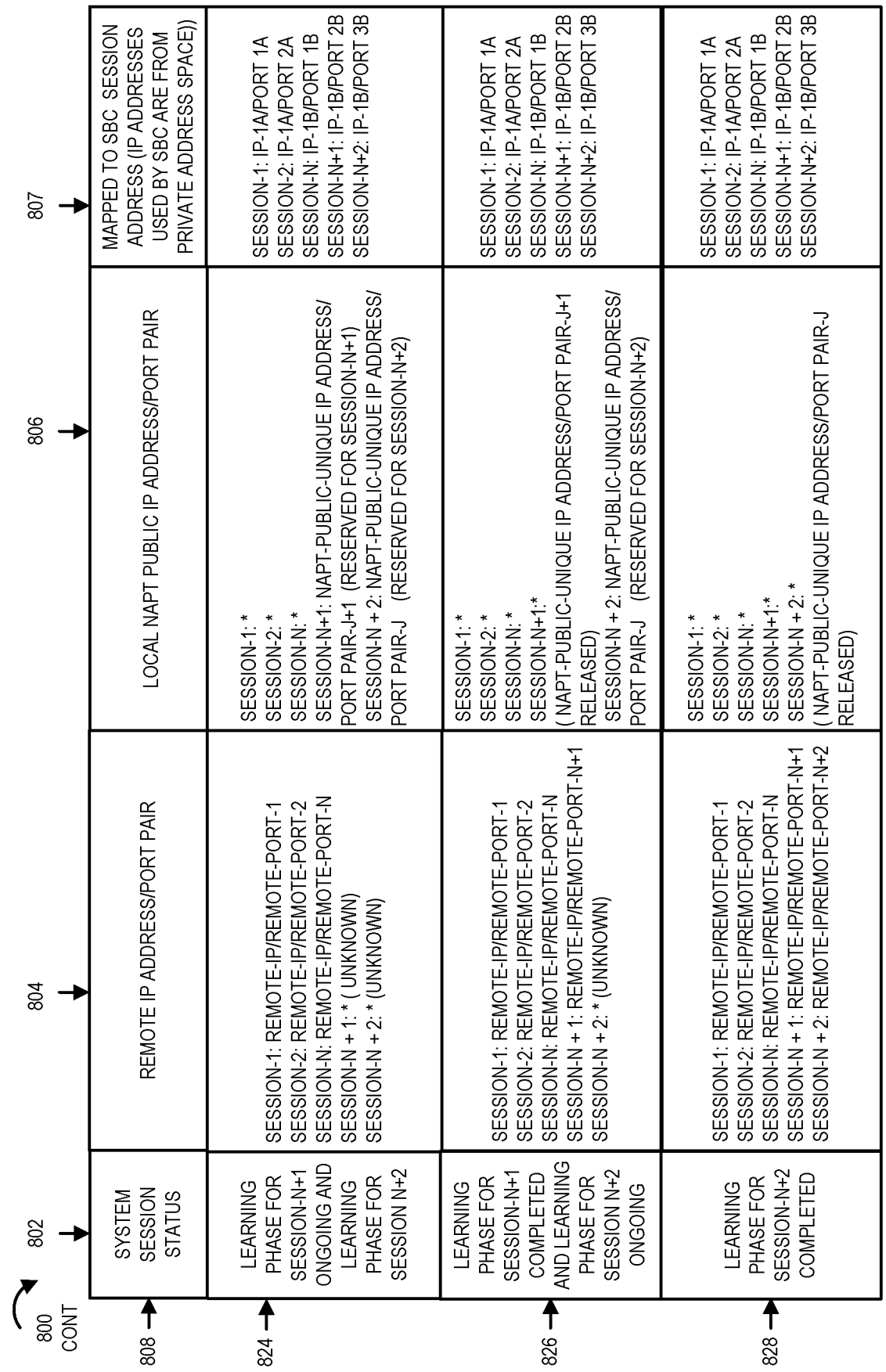

FIG. 8 comprises FIGS. 8A, 8B, and 8C. FIG. 8A is a first part of table 800. FIG. 8B is a second part of table 800. FIG. 8C is a third part of table 800. Table 800 of FIG. 8 illustrates the various states of an exemplary communication system in accordance with one embodiment of the present invention. A corresponding table 800 may be, and in some embodiments is, generated by a NAPT device such as NAPT 108 implemented in accordance with NAPT 400 of FIG. 4 and stored in memory, e.g., data/information section 420 of memory 410. In some embodiments, the information corresponding to table 800 is generated by and stored in memory 310 of the real time communication entity 106, e.g., implemented as SBC 300 of FIG. 3. Row 808 of table 800 is not part of the information included in the table but is a header which has been included for explanatory purposes. Table 800 includes System Session Status information included in column 802, remote IP address/port number pair information included in column 804, local NAPT public IP address/port number pair information included in column 806 and the mapped to SBC session address column 807 in which the IP address/port number pairs used by the SBC for the session are included. Note that the SBC IP address/port number pairs are from private address space. The table 800 includes rows 808, 810, 812, 814, 816, . . . , 818, 820, 822, . . . , 824, 826, and 828. Each row of table 800 is a record that associates the system session status in column 802 with the corresponding remote IP address/port number pair in column 804, the local NAPT public IP address/port pair in column 806, and the SBC private IP address/port to which the remote IP address/port pair and local NAPT public IP address/port pair are mapped. For example, row 810 is a record including the information that the system, e.g., the SBC of the system, is in the learning phase or mode of operation for communication session-1 (row 810, column 802 entry) and that the actual remote IP address/port pair for the media stream of the communication session-1 is unknown at this time (row 810, column 804 entry) and that NAT-PUBLILC_UNIQUE-IP ADDRESS/PORT PAIR-1 has been reserved/allocated by the NAPT for the media of communication session-1 (row 810, column 806). Rows 812, 814, 816, . . . , 818, 820, 822, . . . , 824, 826, and 828 each contain a record with information pertaining to communication sessions in the process of being established or which have been established and the corresponding actual remote IP address/port pairs for the media of each of sessions, the local NAPT public IP Address/Port pair allocated/reserved and/or released from being reserved for the media of each of the sessions as well as the SBC session address to which the remote IP address/port number pair and local NAPT public IP address/port number pair are mapped. The entries of table 800 of FIG. 8 show how the same NAPT public unique IP address/port pair may be used for multiple concurrent media sessions.

In some embodiments, the NAPT and/or SBC use the records and/or some or all of the information stored in table 800 to properly route incoming media packets received at the NAPT and/or SBC and track the allocation of NAPT local public IP address port pair allocations and the corresponding SBC session IP address/port number pairs to which they are mapped.

Figure 9:
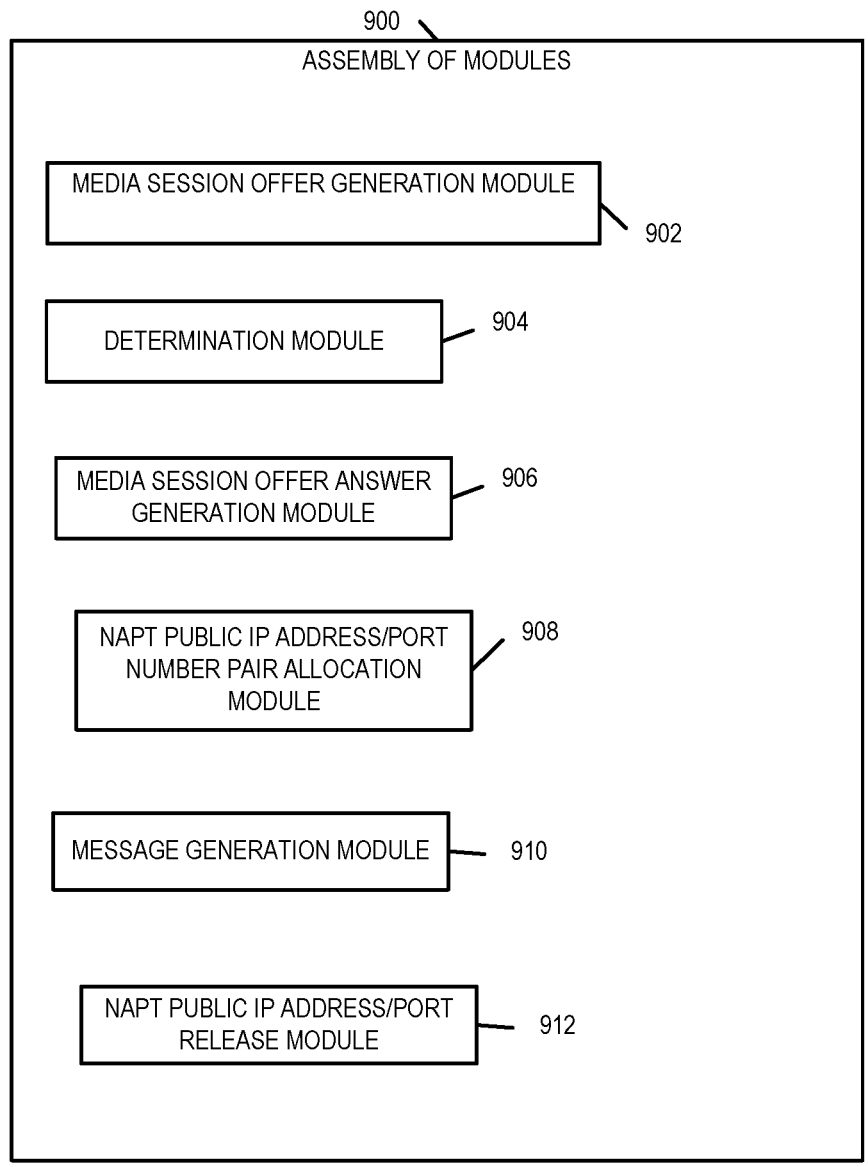
FIG. 9 is an exemplary assembly of modules in accordance with one embodiment of the present invention.

Assembly of modules 900 illustrated in FIG. 9 is an exemplary assembly of modules in one accordance with one embodiment of the present invention which may be, and in some embodiments is, used in the real time communications entity 300 e.g., Session Border Controller 300 as either the assembly of modules 318 and/or the assembly of module 319. In some embodiments one or more modules of the assembly of modules 900 is included in the assembly of modules 318 and/or the assembly of modules 319. One or more of the modules in the assembly of modules 900 may be used in the NAPT device 400 in the assembly of modules 419 and/or assembly of modules 418. Similarly one or more of the modules of the assembly of modules 900 may be included in the user equipment device/remote device 200 assembly of modules 219 and/or 218. The assembly of modules includes a message generation module, a media session offer generation module 902, a determination module 904, media session offer answer module 906, a NAPT public IP address/port number pair allocation module 908, a message generation module 910, a NAPT public IP address/port number pair release module 912. In some embodiments instead of a determination module a determinator device is used for making determinations.

FIGS. 10A, 10B, 10C, 10D, 10E, 10F, and 10G illustrate an exemplary method 1000 and associated signaling in accordance with one embodiment of the present invention. The method 1000 and signaling is shown as being implemented on the system 100 of FIG. 1B. Elements or steps with the same reference numbers used in different figures are the same or similar and those elements or steps will not be described in detail again.

SBC 106 illustrated in FIGS. 10A, 10B, 10C, 10D, 10E, 10F, and 10G is an implementation of the real time communication entity 106 which provides additional details of the elements and components of the real time communication entity. Additionally, SBC 106 of FIGS. 10A, 10B, 10C, 10D, 10E, 10F, and 10G has been implemented in accordance with SBC 300 of FIG. 3 with some variation in the elements to provide clarity in the explanation of the method 1000. SBC 106 public IP/port-1 1018, control signaling I/O interface 1020, private IP/port-3 1022, private IP/port-4 1024 and public IP/port-2 1026 may be interfaces which part of the I/O Interfaces 308 or I/O Interface 309 of SBC 300. These interfaces are typically interfaces configured by the system, e.g., logical interfaces but in some embodiments may be physical IP address/port pairs that are physical dedicated interfaces. The notation IP/port refers to the Internet Protocol address/port number pair. The SBC private IP/port interfaces, private IP/port-3 1022 and private IP/port-4 1024 are IP address/port number pair combinations used in the private network coupling the NAPT 108 to the SBC 106. While these addresses known to the NAPT 108 they are not known to the user equipment devices 1002 and 1003. The NAPT 108 and SBC 106 are in the same IP realm.

The SBC 106 public IP/port I/O Interfaces—public IP/port-1 1018 and public IP/port-2 1026 are used for communicating/exchanging signaling control information with various devices without requiring traversing the NAPT 108. In some embodiments, a single public IP/port pair is used for all signaling communications regarding session establishment instead of two separate public IP/port pairs 1018 and 1026. The SBC 106 public IP address/port pairs are publically available addresses and as such are known to UE 1 102 and UE 2 103 devices which may use these public IP address/port number pairs to exchange with and send from SBC 106 signaling information and messages such as for example, SIP message. The SBC 106 control signaling I/O Interfaces 1020 are to exchange signaling information and message with SBC 106 via NAPT control signaling I/O Interfaces 1028 of NAPT device 108. The SBC 106 control signaling I/O Interfaces 1020 and NAPT control signaling I/O Interfaces 1028 may, and in some embodiments do support a variety of different protocols including SDN signaling protocols, the SIP protocol, SDP protocol, as well as proprietary protocols. The SBC-106 is configured to operate as a SIP back-to-back user agent.

NAPT 108 illustrated in FIGS. 10A, 10B, 10C, 10D, 10E, 10F, and 10G is an implementation of the NAPT 108 which provides additional details of the elements and components of the NAPT 108 of FIG. 1B. Additionally, NAPT 108 of FIGS. 10A, 10B, 10C, 10D, 10E, 10F, and 10G has been implemented in accordance with NAPT device 400 of FIG. 4 with some variation in the elements to provide clarity in the explanation of the invention as described in the embodiment illustrated in method 1000. The NAPT 108 is a IP multiplexer. NAPT 108 control signaling I/O interface 1028, private I/O Interfaces 1030 and Public IP/Port-J are I/O interfaces which are part of the I/O Interfaces 408 or I/O Interfaces 409 of NAPT 400. The private I/O interfaces 1008 are interfaces which are for exchanging information (e.g., media) between the NAPT 108 and the SBC 106. The public IP/port-J is a public IP address/port number pair that is publically known and contactable by user equipment device 1 (UE 1) 102 and user equipment device 2 (UE 2) 103. The public IP/port J is typically an interface which is configured by the system, e.g., a logical interface. While only one NAPT pubic IP/port has been shown the NAPT 108, may in most embodiments does, have a plurality of public IP/ports. The NAPT Session State IP/Port Binding Mapping Table 1050 is binding table stored in data/information section 420 of memory 410. The NAPT 108 performs dynamic binding of public and private NAPT IP/port pairs for communication purposes. Table 1050 is used to track and map the bindings. Table 1050 which is contained in the memory of the NAPT 108 is shown in detail along with the information included in the table. The row 1 of the table 1050 is merely provided for explanatory purposes and provides headings for the columns but would not necessarily be included in the actual table stored in memory. Each row of the table provides information identify the session and its state (column 1), allocated NAPT public IP/port pair for the session (column 2), local pubic IP/port pair for the session (column 3), the remote IP/port pair for the session (column 4) and SBC private IP/port (column 5) used by the SBC 106 to which the media received with destination addresses corresponding to the identified local public IP/port pair or the identified remote IP/port is to be mapped. The SBC private IP/port pair are from the private IP/port address space shared by the NAPT 108 and SBC 106. The NAPT 108 acts as an IP/port multiplexer. The NAPT 108 receives media packets from multiple remote IP address/port number pairs at a single public IP/port number pair, e.g., public IP/port-J and forwards each of the received packets to one of a plurality of different SBC private IP/port number pairs based on the source IP address/port also referred to as the remote IP/port mapping or a mapping between an allocated public IP/port-J pair and a SBC private IP/port.

The user equipment device 1 (UE 1) 102 illustrated in FIGS. 10A, 10B, 10C, 10D, 10E, 10F, and 10G is an implementation of the user equipment device 102 illustrated in FIG. 1B which provides additional details of the elements and components of the UE 1 102. Additionally, UE 1 102 of FIGS. 10A, 10B, 10C, 10D, 10E, 10F, and 10G has been implemented in accordance with the user device 200 of FIG. 2 with some variation in the elements to provide clarity in the explanation of the method 1000. UE 1 102 IP/port A 1010 and IP/port-B 1012 are interfaces which correspond to I/O Interfaces 240 or I/O Interfaces 242 illustrated in user device 200 of FIG. 2. The IP/port A 1010 and IP/port B 1012 are typically interfaces which have been configured on the device such as for example logical interfaces. In some embodiments, these interfaces may be physical interfaces corresponding to the IP/port pairs. The UE 102 IP/port A 1010 in this example is used for communicating and exchanging control signals and information, e.g., SIP and SDP messages with the SBC-106. The UE 102 IP/port B 1012 in this examples is used for communicating and exchanging media signals and information, e.g. RTP packets, with SBC-106.

The user equipment device 2 (UE 2) 103 illustrated in FIGS. 10A, 10B, 10C, 10D, 10E, 10F, and 10G is an implementation of the user equipment device 103 illustrated in FIG. 1B which provides additional details of the elements and components of the UE 2 103. Additionally, UE 2 103 of FIGS. 10A, 10B, 10C, 10D, 10E, 10F, and 10G has been implemented in accordance with the user device 200 of FIG. 2 with some variation in the elements to provide clarity in the explanation of the method 1000. UE 2 103 IP/port-D 1014 and IP/port-C 1016 are interfaces which correspond to the I/O Interfaces 240 or I/O Interfaces 242 illustrated in user device 200 of FIG. 2. The IP/port C 1016 and IP/port-D 104 are typically interfaces which has been configured on the device such as for example logical interfaces. The UE 103 IP/port-C 1016 in this example is used for communicating and exchanging control signals and information, e.g., SIP and SDP messages with the SBC-106. The UE 103 IP/port D 1014 in this examples is used for communicating and exchanging media signals and information, e.g. RTP packets, with SBC-106.

While both the UE 1 102 and UE 2 103 devices are both on public facing side of the NAPT 108, they may not, and often are not, on the same network but instead are on different remote networks and communicate with one another via the SBC 106.

In some embodiments, the UE 1 102 and/or UE 1 103 devices are not user devices but are network devices that communicate with one another via the SBC 106. For example, in some embodiments, the UE 1 103 device is an application server device providing services upon request to the user equipment device 1 102 and UE 1 103 and UE 1 102 and UE 1 103 (network application server) communicate via SBC-106.

Optional network 140 of FIGS. 10A, 10B, 10C, 10D, 10E, 10F, and 10G is the optional network 140 of FIG. 1B. The network 140 is between the SBC 106 and the UE 1 102 and UE 2 103 and between the NAPT 108 and the UE 1 102 and the UE 103. The network 140 includes a variety of communications links and devices which are traversed when communications messages and data are exchanged between the UE 1 102 and the NAPT 108 and the SBC 106. Similarly, the network 140 includes a variety of communications links and devices which are traversed when communications messages and data are exchanged between the UE 2 103 and the NAPT 108 and the SBC 106. These network devices may, and in some embodiments, do include Network Address Translators (NATs) and/or Network Address and Port Translators (NAPTs) which are traversed and which translate the IP address and/or port of messages which pass through them.

While only two user equipment devices are shown the SBC 106 typically supports a large number of devices (as shown in the communications system 100 of FIG. 1B) requiring the use of a large number of IP/port pairs to handle the large number of media session which need to supported for the reasons previously described. As will be explained in detail below, the method 1000 is another exemplary embodiment of the present invention provides a way of efficiently managing the use of Internet Protocol address/port pairs and more particularly to managing the use of IP address/port pairs in connection with network address translation bindings to conserve the use public IP address/port pairs. By efficiently managing the use of public IP address/port pairs, the SBC 106 is capable of supporting more sessions, e.g., media sessions. The method 1000 also provides a cost savings when the public IP address/port pairs are leased as less public IP address/port pairs are required to handle the same number of media sessions thereby providing a monetary cost savings.

The method 1000 begins at step 1100. At step 1100, the UE 1 102 detects a user input and determines in response to the detected input that a Voice Over Internet Protocol (VOIP) call is to be established between UE 1 102 and UE 2 103 via SBC 106. The VOIP call will include a media session. In response to the detected input, UE 1 102 generates a media session offer message and transmits it to UE 2 via the SBC 106. In this example, a SIP INVITE message 1110 including a SDP session offer message is transmitted from UE 1 IP/port-A 1010 to the SBC 106 public IP/port-1. The SIP message 1110 traverses various devices and links in network 140. The UE 1 102 knows the SBC 106 IP/port-1 destination address because it is a public address used by the SBC 106 for control signaling purposes. The SBC 106 receives the SIP message 1110 at its public IP/port 1018.

While the SIP INVITE message 1110 includes an SDP offer message for media session-1, the actual UE-1 IP/port remote address for the media session is not known to the SBC 106 at this time. This is so for a variety of reasons. For example, the UE-1 102 IP/port address identified for media session-1 in the SDP offer message may be a private address that is not reachable by the SBC-106 and/or the UE 1 102 IP/port included in the SDP may have been translated by one or more network devices, e.g., NAT or NAPT devices, in network 140 when the SIP message 1110 traversed network 140. Additionally, the SDP message may not identify a single IP/port to be used for media session-1 but may include a number of UE 1 102 candidate IP address/port pairs to be used for media session-1 in accordance with Interactive Connectivity Establishment (ICE) protocol method. In this example, the media session-1 offer included in SIP INVITE message 1110 is generated in accordance with ICE procedures and includes a plurality of UE 1 102 candidate IP address/port pairs. As such, the actual UE 1 102 IP/port to be used for media session-1 is unknown when the session offer is received at SBC 106.

Operation proceeds from step 1100 to step 1120. In step 1120, the SBC 106 receives and processes the SIP Invite message 1110 including the media session-1 offer message. The SBC 106 operates in a SIP back-to-back user agent mode and begins operations to establish media session-1 with UE 1 102. The SBC 106 determines that the actual remote IP/port address, i.e., UE 1 IP/port, to be used for the media session-1 is not known as the message includes a plurality of candidate UE 1 IP/port pairs in accordance with the ICE procedure for establishing a media session. In response to receiving the media session-1 offer message without the identification of the actual remote IP/port address to be used for the session, the SBC 106 enters into a learning phase for media session-1. As part of the learning phase, the SBC 106 generates an allocate NAPT local public IP/port request 1140 to be used for receiving media from UE 1 102 in connection with media session-1. The allocate request signal in this example is a message requesting the allocation of a local public IP/port address on the NAPT 108 wherein the NAPT 108 is to bind the allocated local public IP/port pair to a SBC 106 private IP/port identified in the request. In this example, the allocate request 1140 identifies SBC 106 private IP/port-3 1022 as the SBC 106 IP/port to which the allocated NAPT local IP/port is to be bound.

Operation proceeds from step 1120 to step 1130. In step 1130, SBC-106 transmits or sends the allocate request 1140 from one of the control signaling interfaces of SBC 106 control signaling I/O interfaces 1020 to one of the NAPT 108 control signaling I/O interfaces. Operation proceeds from step 1130 to step 1150.

In step 1150, NAPT 108 receives the allocate request 1140 at one of the I/O interfaces of control signaling I/O Interfaces 1028. The NAPT 108 processes the received allocate request 1130 and determines that the SBC 106 is requesting the allocation of a NAPT local public IP/port to be used for a media session and to be bound to SBC 106 private IP/port-3. In some embodiments, additional session information such as a session identifier or information from the session offer is also included in the allocate request. The NAPT 108 allocates a public IP/port from a pool of available NAPT public IP/ports and reserves it as being allocated for the local public IP/port for media session-1. When the NAT allocates the public IP/port as being reserved for the local public IP/port for media session-1, the NAPT 108 removes the reserved public IP/port from the pool of available public/IP ports that may be allocated for media sessions and binds/maps the NAPT 108 allocated public/IP port to the SBC 106 private IP/port identified in the allocation request. All media packets received at the allocated public IP/port with a remote, i.e., source, IP/port that is unknown to the NAPT 108 will be forwarded to the SBC 106 private IP/port to which the allocated public IP/port was bound.

In this example, the NAPT 108 allocates public IP/port J 1040 of NAPT 108 for media session-1 and binds it to SBC private IP/port-3 1022, the SBC 106 private IP/port identified in the allocate request. The NAPT 108 binds the allocated NAPT public IP/port-J to SBC private IP/port-3 by creating entries in the NAPT Session State IP/port binding mapping table 1050 stored in the NAPT 108 memory. In this example, the information in row 2 of the table 1050 is generated and populated by the NAPT 108. The session state is learning phase for media session-1, the allocated NAPT public IP/port is public IP/port-J 1040, the local public IP/port is public IP/port-J 1040, the entry for the remote IP/port is a *, or in some embodiments contains no entry, indicating the remote IP/port for UE 1 is unknown during this learning phase, and SBC private IP/port is SBC IP/port-3. In this example, prior to the allocation request the NAPT public IP/port-J 1040 was not in use that is it was not being used for another media session and was not actively bound to any addresses.

While an entry on the table for the session state has been shown this entry is optional as the entry of a value in the local public IP/port column indicates that the media session for which the NAPT 108 public IP/port was allocated, is in a learning phase and that this NAPT public IP/port has been reserved and is not available to be allocated for another media session at this time.

When a local public IP/port is allocated, it is reserved for the media session for which it has been allocated. In this example, NAPT pubic IP/port-J 1040 has been allocated as a local public IP/port for media session-1. This means that NAPT 108 will identify the source IP/port number for each packet received at public IP/port-J 1040. It will then perform a query or look up in the NAPT session state IP/port binding mapping table 1050 based on the public IP/port-J 1040 and the identified source IP/port of the packets. First, the NAPT searches the allocated NAPT public IP/port column and identifies all rows in the table 1050 in which the allocated NAPT public IP/port column entry matches public IP/port-J. Each of these rows will correspond to a session in which the NAPT 108 has an active binding. Next the NAPT 108 searches the subset of rows that have been identified in which the NAPT 108 has an active binding for public IP/port-J and searches the remote IP/port column of each of these rows to see if there is an entry that matches the source IP/port. If the NAPT 108 identifies an entry with a match then it looks in the SBC private IP/port column for the corresponding SBC-106 private IP/port pair to which the received packet is destined and forwards the packet to the SBC-106 private IP/port identified as a match. If there are no matching entries in the remote IP/port column then the NAPT determines that there are no active bindings for the identified source/IP port of the packet. If that is the case, the NAPT 108 next checks the subset of rows identified as corresponding to an active binding for the public IP/port-J to see if there is an entry in the local public IP/port column. In this case, there is only 1 row in the table with an allocated NAPT public IP/port matching the public IP/port-J on which the packet was received and it has the local public IP/port set to the public IP/port-J so it is a match. All data packets received at the NAPT public IP/port-J will be mapped to the SBC IP/port-3 and sent to the SBC-106 IP/port-3 1022 at this time. There are many ways to organize the translation table as well as perform the lookup and search of the translation table. The method of organizing the translation table and searching the translation table is exemplary and has been provided for explanatory purposes.

Figure 10A:
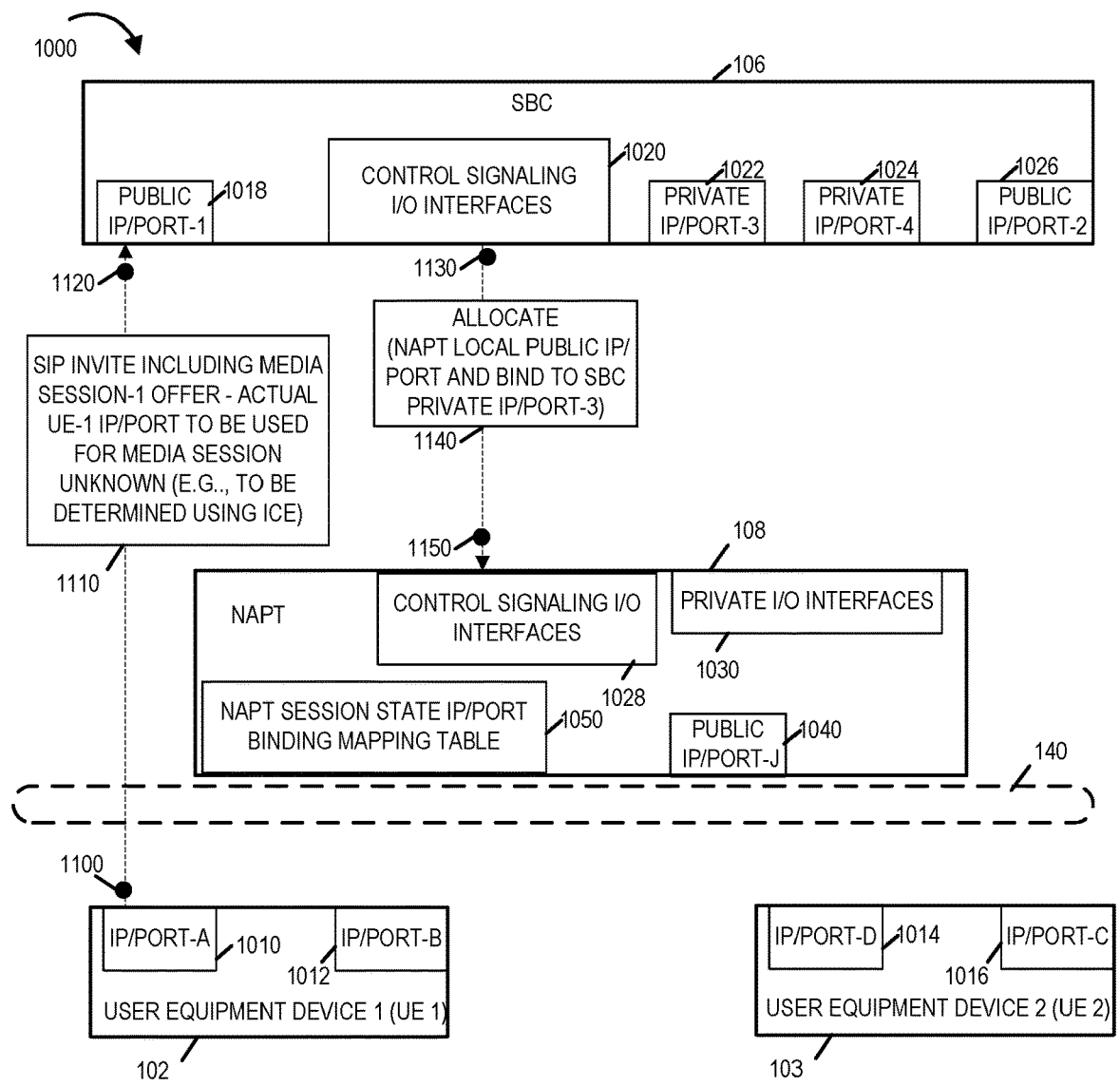
FIG. 10A illustrates an exemplary communications system and a first part of an exemplary method in accordance with one embodiment of the present invention.
Figure 10B:
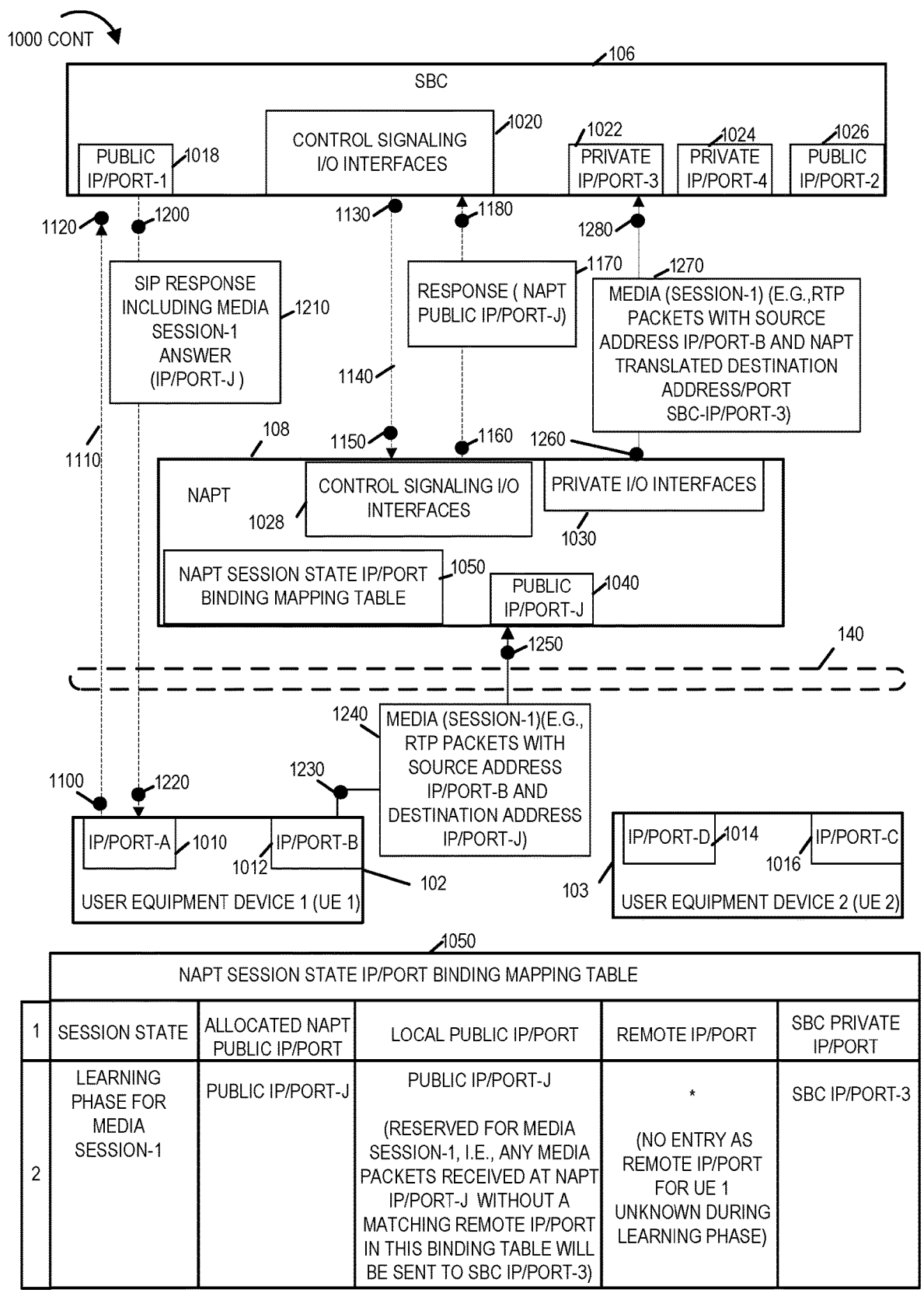
FIG. 10B illustrates an exemplary communications system and a second part of an exemplary method in accordance with one embodiment of the present invention.
Figure 10C:
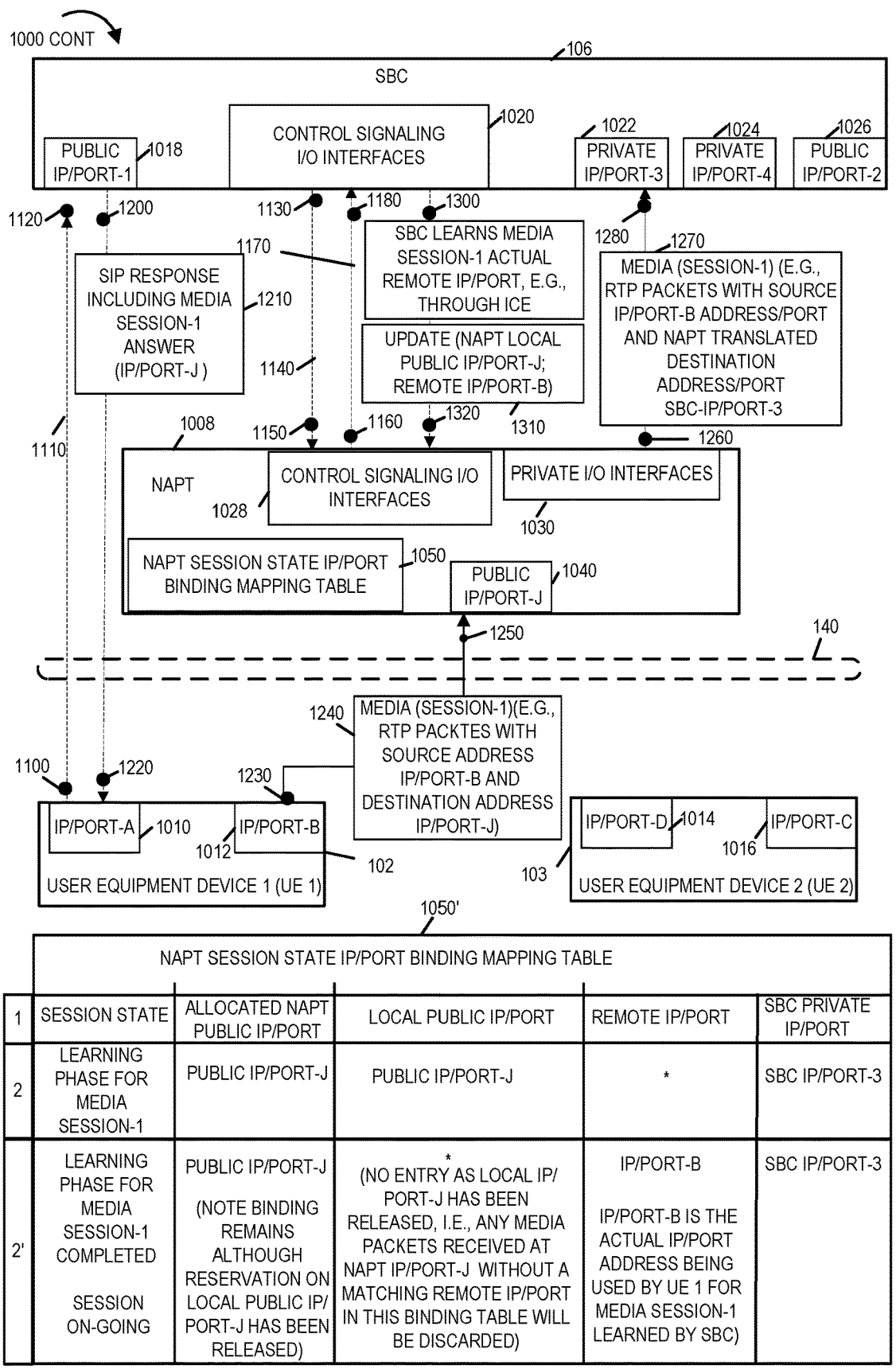
FIG. 10C illustrates an exemplary communications system and a third part of an exemplary method in accordance with one embodiment of the present invention.
Figure 10D:
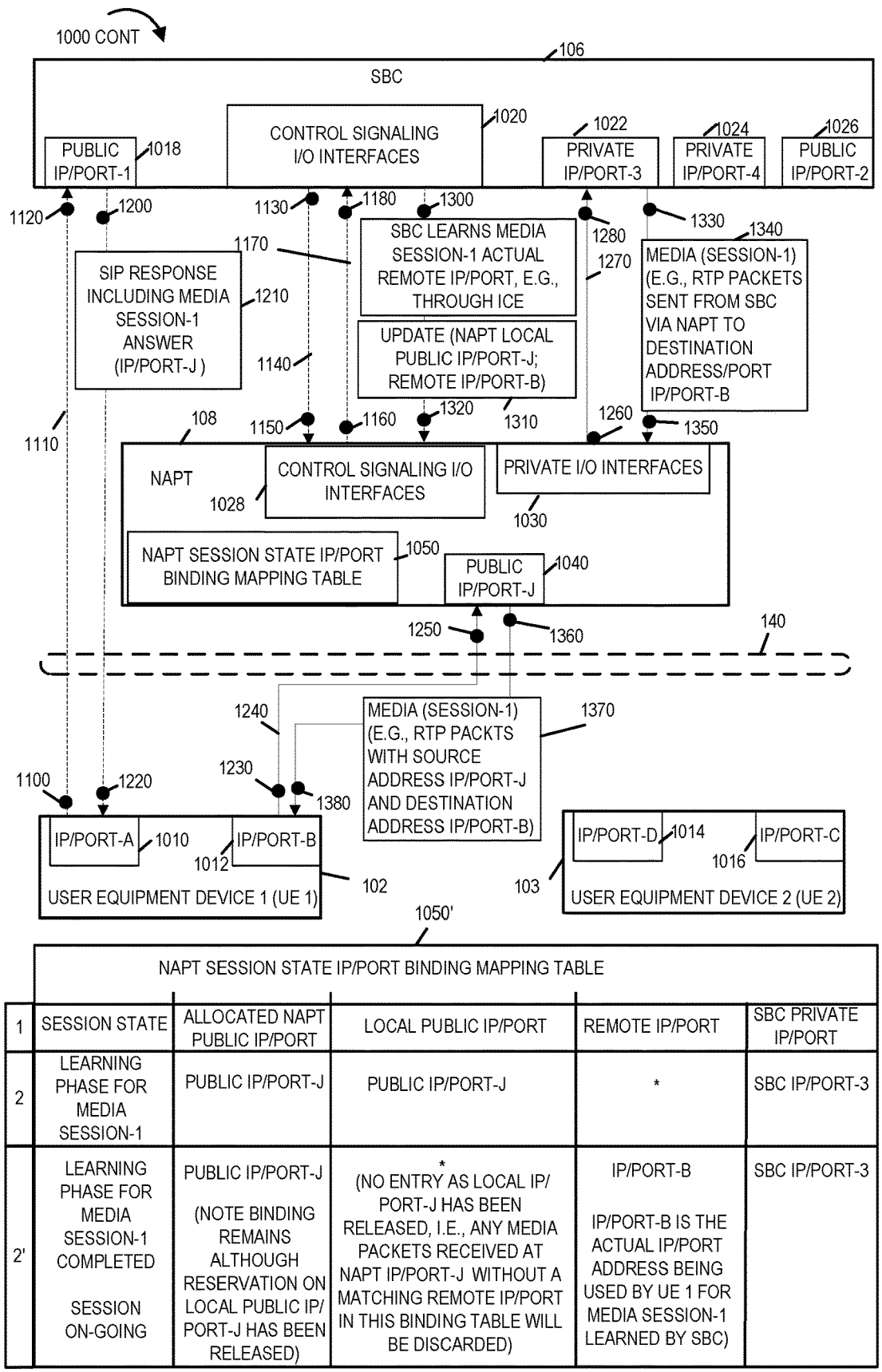
FIG. 10D illustrates an exemplary communications system and a fourth part of an exemplary method in accordance with one embodiment of the present invention.

Operation proceeds from step 1150 to step 1160 shown on FIG. 10B. In step 1160, the NAPT 108 generates a response message 1170 in response to allocation request 1140. The response message 1170 includes the NAPT public IP/port-J reserved by the NAPT 108 in response to the allocation request for media session-1. The response message 1170 is transmitted or sent from one of the NAPT 108 control signaling I/O Interfaces 1028 to the SBC 106.

Operation proceeds from step 1160 to step 1180. In step 1180, the SBC 106 receives the response message 1170 at one of the SBC 106 control signaling I/O Interfaces 1020. The SBC 106 processes the response message 1170. In processing the response message 1170, the SBC 106 determines the NAPT public IP/port allocated in response to allocation request 1140. In some embodiments, the response message also includes a session identifier, e.g., media session-1, which was included in the allocation request so that the SBC 106 can determine for which session the NAPT public IP/port was allocated. In some embodiments, the response message includes the SBC 106 private IP/port which was included in the allocation request 1140. Based on the SBC 106 private IP/port information included in the response message 1170, the SBC 106 then determines for which media session the NAPT 108 public IP/port has been allocated. In such embodiments, including the SBC private IP/port address also serves as verification that the NAPT 108 has mapped the NAPT 108 public IP/port included in the response message to the correct SBC private IP/port. In some embodiments, the allocation request includes an allocation request identifier which the SBC 106 maps to the session offer. In some of these systems, the NAPT 108 response to the allocation request also includes a copy of the allocation request identifier. In some of these systems, the NAPT 108 does not track which specific sessions the NAPT 108 public IP/ports are allocated but only that they have been allocated for use for a session and whether or not the NAPT 108 local IP/port is reserved.

When the SBC 106 determines the NAPT 108 local public IP/port which has been allocated for media session-1 from the received response 1170, the SBC 106 stores in memory or a storage device information identifying the session (media session-1) and the corresponding NAPT 108 public IP/port (NAPT 108 IP/port-J 1040) allocated by the NAPT 108 for the session and the corresponding SBC 106 private IP/port (SBC Private IP/port-3 1022) to which the NAPT 108 allocated public IP/port is bound or mapped. Operation proceeds from step 1180 to step 1200.

In step 1200, the SBC 106 generates a SIP response message 1210 which may be, and in some embodiments is, a SIP 200 message including an answer to the media session-1 offer received in step 1120. The media session-1 answer includes the identification of the local public IP/port allocated for media session-1 by the NAPT 108 as the destination IP address/port to which the UE 1 102 device is to send media, e.g., RTP packets for media session-1. In some embodiments, the media session-1 answer is a SDP answer message. The SBC 106 transmits the SIP response 1210 including the media session-1 answer to the user equipment device 1 102 from SBC 106 public IP/port-1 to UE 1 102 IP/port A. In those embodiments, in which the network 140 is included the SIP message 1210 traverses the network 140 and various network devices included therein. Operation proceeds from step 1200 to step 1220.

In step 1220, UE 1 102 receives the SIP response message 1210 at UE 1 IP/port-A 1010. The UE 1 102 processes the received SIP response message and determines the media session-1 answer. From the media session-1 answer, the UE 1 102 identifies the destination IP address/port to be used to send media for the media session-1. In this example, the destination IP address/port is the NAPT 108 public IP/port-J included in the answer message 1210. In this example, the UE 1 102 and SBC 106 follow the ICE procedures to confirm and verify the IP/port address destinations to be used for media session-1. The ICE procedure is being used because the network 140 may and in most embodiments does include one or more NAT or NAPTs that will modify the IP/port addresses of UE 1 102. UE 1 102 stores in its memory a mapping of media session-1, local UE 1 IP/port-B 1012 to destination public IP/port-J. Operation proceeds from step 1220 to step 1230.

In step 1230, the UE 1 102 generates and transmits media 1240 for media session-1, e.g., RTP packets containing audio data, from UE 1 IP/port-B to NAPT 108 public IP/port-J 1040 via network 140. The media 1240 may be, and in some embodiments is, a stream of RTP packets with the source address identified as IP/port-B and the destination address identified as IP/port-J 1040. Operation proceeds from step 1230 to step 1250.

In step 1250, the NAPT 108 receives the media 1240 which are part of media session-1, e.g., RTP packet messages, at public IP/port-J 1040. The NAPT 108 upon receiving the media 1240 performs a search and/or lookup in the NAPT session state IP/report binding mapping table 1050 to determine the destination IP address/port translation to be performed. The search and/or lookup is based on the identification of the NAPT IP/port on which the media was received and the source IP/port from which the media was sent. In this example, the NAPT IP/port on which the media was received is NAPT public IP/port-J 1040 and the source IP address/port is IP/port-B. At this time the only entry in the NAPT session state IP/port binding mapping table 1050 or NAPT public IP/port-J is shown in row 2 of the table. The system is in the learning phase for media session-1, there is no remote IP/port identified at this time as the actual remote IP/port for media session-1 has not yet been determined and is therefore still unknown. The local public IP/port-J of the NAPT 108 is currently mapped to SBC 106 private IP/port-3 1022. The source address of the media, e.g., RTP packets, IP/port-B does not match any remote IP/port entries corresponding to public IP/port-J. As a result, the local public IP/port mapping of the NAPT public IP/port-J is used for determining the destination of the media. In this case, the public IP/port-J is mapped to SBC private IP/port-3 1022. Operation proceeds from step 1250 to step 1260.

In step 1260, the NAPT 108 transmits or forwards the received media 1240 of media session-1 from one of the NAPT private I/O Interfaces 1030 to the SBC 106 private IP/port-3 identified in the search or lookup of the NAPT session state IP/port binding mapping table 1050. The transmitted or forwarded media 1270 includes the media, e.g., RTP packets with source address IP/port-B and NAPT translated destination address/port SBC IP/port-3. In some embodiments, the NAPT 108 opens up a virtual tunnel between NAPT 108 and the SBC 106 for exchanging media for media session-1. Operation proceeds from step 1260 to step 1280.

In step 1280, the media 1270, e.g., RTP packets, is received at the SBC 106 private IP/port-3 1022. Operation proceeds from step 1280 shown on FIG. 10B to step 1300 shown on FIG. 10C.

In step 1300, the SBC 106 learns media session-1 actual remote IP/port, e.g., through the ICE procedure. In this example, the SBC 106 processes the received packets and learns or determines that the media is part of media session-1 based on the SBC IP/port on which the media was received. It looks up the media session associated with the SBC private IP/port-3 and determines that media received on this IP/port corresponds to media session-1. The SBC 106 determines the actual remote IP/port of UE 1 102 being used by UE 1 to send and receive media for media session-1 for example using the ICE procedure and/or identifying the remote IP address/port from the first RTP packet received. In this example, the SBC 106 learns or determines the actual remote IP/port for media session-1 using the ICE procedure. The remote IP/port address of UE 1 102 for media session-1 is the source IP address/port of the received media which is IP/port-B. SBC 106 updates a table of active sessions it contains in memory to identify that media for media session-1 is being received on SBC private IP/port-3 1022 from actual remote IP/port IP/port-B. The SBC 106 generates an update signal or message 1310 to send to the NAPT 108 to update the NAPT 108 on the actual IP/port for media session-1. In this example, the UPDATE message includes NAPT local public IP/port parameter is set to IP/port-J and the learned actual remote IP/port parameter is set to IP/port-B. In some embodiments, if an allocation request identifier was included in the allocation request 1140, the same identifier is included in the update request message allowing the NAPT 108 to correlate which binding/mapping that is to be updated. In some such embodiments, the NAPT local pubic IP/port parameter does not need to be included in the update request. In some embodiments, a media session identifier identifying the session for which the remote IP/port is included if the NAPT 108 was previously provided an identifier for media session-1 by the SBC-106. The media session identifier, i.e., media session-1, may then be used for correlating which bindings/mappings are to be updated. The generated update request message 1310 is transmitted or sent from the SBC 106 control signaling I/O interface 1020 to the NAPT 108. Operation proceeds from step 1300 to step 1320.

In step 1320, the NAPT 108 receives the Update request signal/message at NAPT control signaling I/O Interfaces 1028. The NAPT 108 processes the received Update request. The NAPT 108 identifies the entries in the NAPT session state IP/port binding mapping table 1050 which need to be updated and updates those entries. In this example, row 2 needs to be updated. Row 2' shown in NAPT session state IP/port binding mapping table 1050' shows the updates performed by NAPT 108 in response to receiving the update request 1310. The session state is hanged from learning phase for media session-1 to learning phase for media session-1 completed/session ongoing. the allocated NAPT public IP/port remains public IP/port-J. The local public IP/port is changed from public IP/port-J to a * indicating no entry as local IP/port-J has been released, i.e., any media packets received at NAPT IP/port-J without a matching remote IP/port in this binding table will be discarded. The remote IP/port entry is changed from * indicating no entry to IP/port-B which is the actual IP/port destination being used by UE 1 for media session-1 learned by SBC 106 and communicated to the NAPT 108 in the Update message 1310. The SBC private IP/port remains SBC IP/port-3. It should be noted that although the reservation on the local public IP/port-J has been released the public IP/port-J remains actively bound/mapped to SBC private IP/port-3 for media session-1 through the remote IP/port entry in the table. The NAPT 108 releases the reservation on the local public IP/port-J and makes determinations on where to send incoming media received on the NAPT 108 public IP/port-J 1040 based on the remote IP/port address which is the source IP/port address from which the packets are received. With the release of the reservation of the local public IP/port-J, the NAPT 108 places the NAPT public IP/port-J 1040 back into the pool for use in connection with requests for the allocation of local public IP/port pairs for new media sessions. The NAPT 108 is designed to serve as IP multiplexing receiving media from a plurality of different IP/port sources on a single public IP/port and routing the media to the correct SBC private IP/port on SBC 106 based on the remote IP/port from which the media is received and to simultaneously reserve a particular SBC 106 private IP/port during the remote IP/port learning phase of a single media session. Operation proceeds from step 1320 to step 1330 shown on FIG. 10D. The manner in which the SBC 106 sends or transmits media for media session-1 will now be explained.

In step 1330, SBC 106 transmits media 1340, e.g., RTP packets, for media session-1 from private IP/port-3 1022 to NAPT 108 for transmittal from public IP/port-J to UE 1 102 IP/port-B. The media 1340 includes destination address/port IP/port-B. In some embodiments, the media is transmitted via a virtual tunnel that was opened by the NAPT 108 for use in exchanging media for the media session-1. Operation proceeds from step 1330 to step 1350.

In step 1350, the media 1340 is received at NAPT 108 on one of the private I/O Interfaces 1030. The NAPT 108 processes the received media 1340. Operation proceeds from step 1350 to step 1360.

In step 1360, the NAPT 108 routes the media 1340 received to the destination address IP/port B via NAPT public IP/port-J 1040. In some embodiments in which the media 1340 is communicated to the NAPT 108 with a source address of the SBC private IP/port-3 the NAPT 108 will translate the source address of the media packets to the NAPT 108 public IP/port-J based on a lookup in the NAPT session state IP/port binding mapping table 1050' row 3 using one or both of the source address provided in or with the media packets or destination address provided in or with the media packets. In some embodiments, if a private NAPT 108 I/O Interface IP/address port pair is provided as the destination address, the destination address is translated to the destination address IP/port-B based on a lookup in the NAPT session sate IP/port binding mapping table based on the source address SBC IP/port-3 shown in row 2' of table 1050'. In some such embodiments, an additional column may be and often is included in the NAPT session state IP/port binding mapping table which includes the NAPT private I/O Interface being used for the session, e.g., media session-1 corresponding to the SBC private IP/port being used for the session. The NAPT 108 transmits or sends the media for session-1 1370, e.g., RTP packets with source address IP/port-J and destination address IP/port-B to UE 1 102. The media 1370 in some embodiments is the media 1340 reformatted and with any source and/or destination IP address/port translations necessary performed as previously described. In some embodiments, the media 1370 is a forwarded version of media 1340. Operation proceeds from step 1360 to step 1380.

In step 1380, the UE 1 102 receives the media 1370 from the NAPT 108 at IP/port-B 1012 where the media 1370 is processed.

Figure 10E:
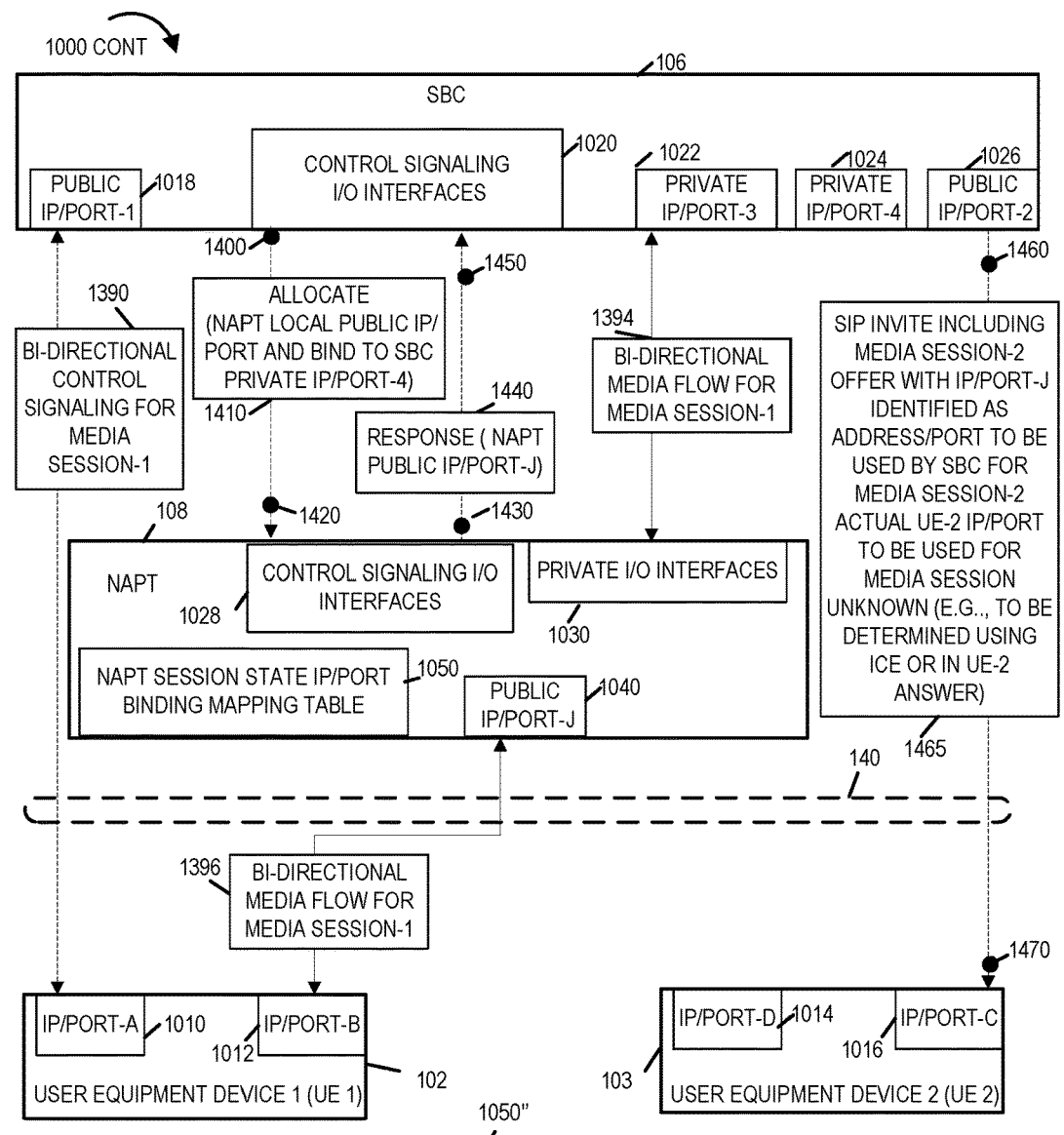
FIG. 10E illustrates an exemplary communications system and a fifth part of an exemplary method in accordance with one embodiment of the present invention.

At this time, as shown on FIG. 10E, bi-directional control signaling 1390 for media session-1 is exchanged between SBC 106 public IP/port-1 1018 and UE 1 102 IP/port-A 1010. Also shown in FIG. 10E, is the bi-directional media flow for media session-1 between UE 1 102 and SBC 106 which passes through NAPT 108. Media 1396 for media session-1 is communicated to/from IP/port-B on UE 1 102 from/to NAPT 108 public IP/port-J 1040. The media 1394 for media session-1 is communicated to/from NAPT 108 private I/O Interfaces 1030 from/to SBC 106 private IP/port-3.

In this example, the SBC 106 is acting as a back-to-back user agent and the media is ultimately destined for user equipment device 2 (UE 2) 103. To accomplish this the SBC 106 now establishes a second media session between SBC 106 and UE 103. Operation proceeds from step 1370 to step 1400.

In step 1400, SBC 106 generates and sends a second allocate request to NAPT 108 similar to the one sent for media session-1. The second allocate request is shown in FIG. 10 D as allocate request 1410, Allocate (NAPT local public IP/port and bind to SBC private IP/port-4). Allocate request 1410 requests the allocation by the NAPT 108 of a NAPT local public IP/port and that the allocated NAPT local public IP/port be bound to the SBC private IP/port-4. Allocate request 1410 is similar to allocate request 1140 previously discussed and may include one of more of the additional features discussed in connection with allocation request 1140, e.g., including an allocation request identifier, session identifier, etc. The allocate request 1410 is transmitted from SBC 106 control signaling I/O interfaces 1020 to the NAPT 108. Operation proceeds from step 1400 to step 1420.

In step 1420, the NAPT 108 receives the allocate request 1410 at control signaling I/O Interfaces 1028. The NAPT 108 processes the received allocation request 1410 in the same or a similar manner in which allocation request 1140 was processed. In processing the allocate 1410 request, the NAPT 108 determines that the SBC 106 is requesting the allocation of a NAPT local public IP/port to be used for a media session and to be bound to SBC 106 private IP/port-4. In some embodiments, additional session information such as a session identifier or information from the session offer is also included in the allocate request. The NAPT 108 allocates a public IP/port from a pool of available NAPT public IP/ports and reserves it as being allocated for the local public IP/port for media session-2. When the NAT allocates the public IP/port as being reserved for the local public IP/port for media session-2, the NAPT 108 removes the reserved public IP/port from the pool of available public/IP ports that may be allocated for media sessions and binds/maps the NAPT 108 allocated public/IP port to the SBC 106 private IP/port identified in the allocation request. All media packets received at the allocated public IP/port with a remote, i.e., source, IP/port that is unknown to the NAPT 108 will be forwarded to the SBC 106 private IP/port to which the allocated public IP/port was bound.

In this example, the NAPT 108 allocates public IP/port J 1040 of NAPT 108 for media session-2 and binds it to SBC private IP/port-4 1024, the SBC 106 private IP/port identified in the allocate request. The NAPT 108 binds the allocated NAPT public IP/port-J to SBC private IP/port-4 by creating entries in the NAPT Session State IP/port binding mapping table 1050" stored in the NAPT 108 memory. In this example, the information in row 3 of the table 1050" is generated and populated by the NAPT 108. The session state is learning phase for media session-2, the allocated NAPT public IP/port is public IP/port-J 1040, the local public IP/port is public IP/port-J 1040, the entry for the remote IP/port is a *, or in some embodiments contains no entry, indicating the remote IP/port for UE 2 is unknown during this learning phase, and SBC private IP/port is SBC IP/port-4. The local public IP/port mapping of NAPT public IP/port-J to SBC private IP/port-4 is reserved for media session-2, i.e., any media packets received at NAPT public IP/port-J without a matching remote IP/port in the binding/mapping table will be sent to SBC IP/port-4.

In this example, prior to the allocation request the NAPT public IP/port-J 1040 was in use and is being used for media session-1 with the bindings/mappings shown in row 2' of the NAPT session state IP/port binding mapping table 1050" of FIG. 10E. The present invention allows the re-use of the public IP/port-J for both media session-1 and media session-2 as the NAPT 108 is a multiplexer which will route media received based on the actual remote address, i.e., source address of the received media when it is know, or if the actual remote address is unknown based on the reserved unique local public IP/port to SBC private IP/port binding/mapping.

Operation proceeds from step 1420 to step 1430. In step 1430, the NAPT 108 generates a response signal/message 1440 to the allocation request 1410. The response message 1440, Response (NAPT public IP/port-J), includes the NAPT public IP/port-J reserved by the NAPT 108 in response to the allocation request for media session-2. The response message 1440 is transmitted or sent from one of the NAPT 108 control signaling I/O Interfaces 1028 to the SBC 106.

Operation proceeds from step 1430 to step 1450. In step 1450, the SBC 106 receives the response message 1440 at one of the SBC 106 control signaling I/O Interfaces 1020. The SBC 106 processes the response message 1440. In processing the response message 1170, the SBC 106 determines the NAPT public IP/port allocated in response to allocation request 1410. In some embodiments, the response message also includes a session identifier, e.g., media session-2, which was included in the allocation request so that the SBC 106 can determine for which session the NAPT public IP/port was allocated. In some embodiments, the response message includes the SBC 106 private IP/port which was included in the allocation request 1410. Based on the SBC 106 private IP/port information included in the response message 1440, the SBC 106 then determines for which media session the NAPT 108 public IP/port has been allocated. In such embodiments, including the SBC private IP/port address also serves as verification that the NAPT 108 has mapped the NAPT 108 public IP/port included in the response message to the correct SBC private IP/port. In some embodiments, the allocation request includes an allocation request identifier which the SBC 106 maps to the session offer. In some of these systems, the NAPT 108 response to the allocation request also includes a copy of the allocation request identifier. In some of these systems, the NAPT 108 does not track which specific sessions the NAPT 108 public IP/ports are allocated but only that they have been allocated for use for a session and whether or not the NAPT 108 local IP/port is reserved.

When the SBC 106 determines the NAPT 108 local public IP/port which has been allocated for media session-2 from the received response 1440, the SBC 106 stores in memory or a storage device information identifying the session (media session-2) and the corresponding NAPT 108 public IP/port (NAPT 108 IP/port-J 1040) allocated by the NAPT 108 for the session and the corresponding SBC 106 private IP/port (SBC Private IP/port-4 1024) to which the NAPT 108 allocated public IP/port is bound or mapped. Operation proceeds from step 1450 to step 1460.

In step 1460, the SBC 106 generates a SIP INVITE message 1465 including a media session-2 offer for establishing media session-2. The actual UE-2 IP/port to be used for media session-2 is unknown at this time but will be determined in the future e.g., by using ICE and/or from the UE-2 answer to the media session-2 offer. The media session-2 offer includes the identification of the local public IP/port allocated for media session-2 by the NAPT 108 as the destination IP address/port to which the UE 2 103 device is to send media, e.g., RTP packets for media session-2. In some embodiments, the media session-2 offer is a SDP offer message. The SBC 106 transmits the SIP INVITE 1465 including the media session-2 offer to the user equipment device 2 103 from SBC 106 public IP/port-2 1026 to UE 2 103 IP/port C 1016. In those embodiments in which the network 140 is included the SIP message 1465 traverses the network 140 and various network devices included therein. Operation proceeds from step 1460 to step 1470.

In step 1470, UE 2 103 receives the SIP offer message 1465 at UE 2 103 IP/port-C 1016. The UE 2 103 processes the received SIP INVITE message and identifies the media session-2 offer. From the media session-2 offer, the UE 2 103 identifies the destination IP address/port to be used to send media for the media session-2. In this example, the destination IP address/port is the NAPT 108 public IP/port-J included in the offer message 1465. In this example, the UE 2 103 and SBC 106 follow the ICE procedures to confirm and verify the IP/port address destinations to be used for media session-2. The ICE procedure is being used because the network 140 may and in most embodiments does include one or more NATs or NAPTs that will modify the IP/port addresses such as the IP address/port of UE 2 103. UE 2 103 stores in its memory a mapping of media session-2, local UE 2 IP/port-D 1014 to destination public IP/port-J. Operation proceeds from step 1470 to step 1480 shown on FIG. 10F.

In step 1480, the UE 2 103 generates a SIP response message 1490 which may be, and in some embodiments is, a SIP 200 message including an answer to the media session-2 offer received in step 1470. The media session-2 answer includes the identification of the UE 2 103 IP/Port-D 1014 as the destination IP address/port to which the SBC 106 is to send media, e.g., RTP packets for media session-2. In some embodiments, the media session-2 answer is a SDP answer message. The UE 2 103 transmits from IP/port-C 1016 to the SBC 106 public IP/port-2, the SIP response 1490 including the media session-2 answer. In those embodiments, in which the network 140 is included the SIP message 1490 traverses the network 140 and various network devices included therein. Operation proceeds from step 1480 to step 1500.

In 1500, the SBC 106 receives the SIP response message 1490 at public IP/port 2 1026 from UE 2 103. The SIP response message 1490 may, and in some embodiments does, include candidate addresses for contacting UE 2 103 per the ICE procedure. The actual remote IP/port which the UE 2 103 will be using for media session-2 is still unknown by the SBC 106 as the address/port information included in the media session-2 may have been translated by one or more NATs or NAPTs or other devices which the SIP response message 1490 traversed such as for example network devices in network 140.

Operation proceeds from step 1400 to step 1510. In step 1510, the UE 2 103 generates and transmits media 1520 for media session-2, e.g., RTP packets containing audio data, from UE 2 IP/port-D 1014 to NAPT 108 public IP/port-J 1040 via network 140. The media 1520 may be, and in some embodiments is, a stream of RTP packets with the source address identified as IP/port-D and the destination address identified as IP/port-J 1040. Operation proceeds from step 1510 to 1530.

Figure 10F:
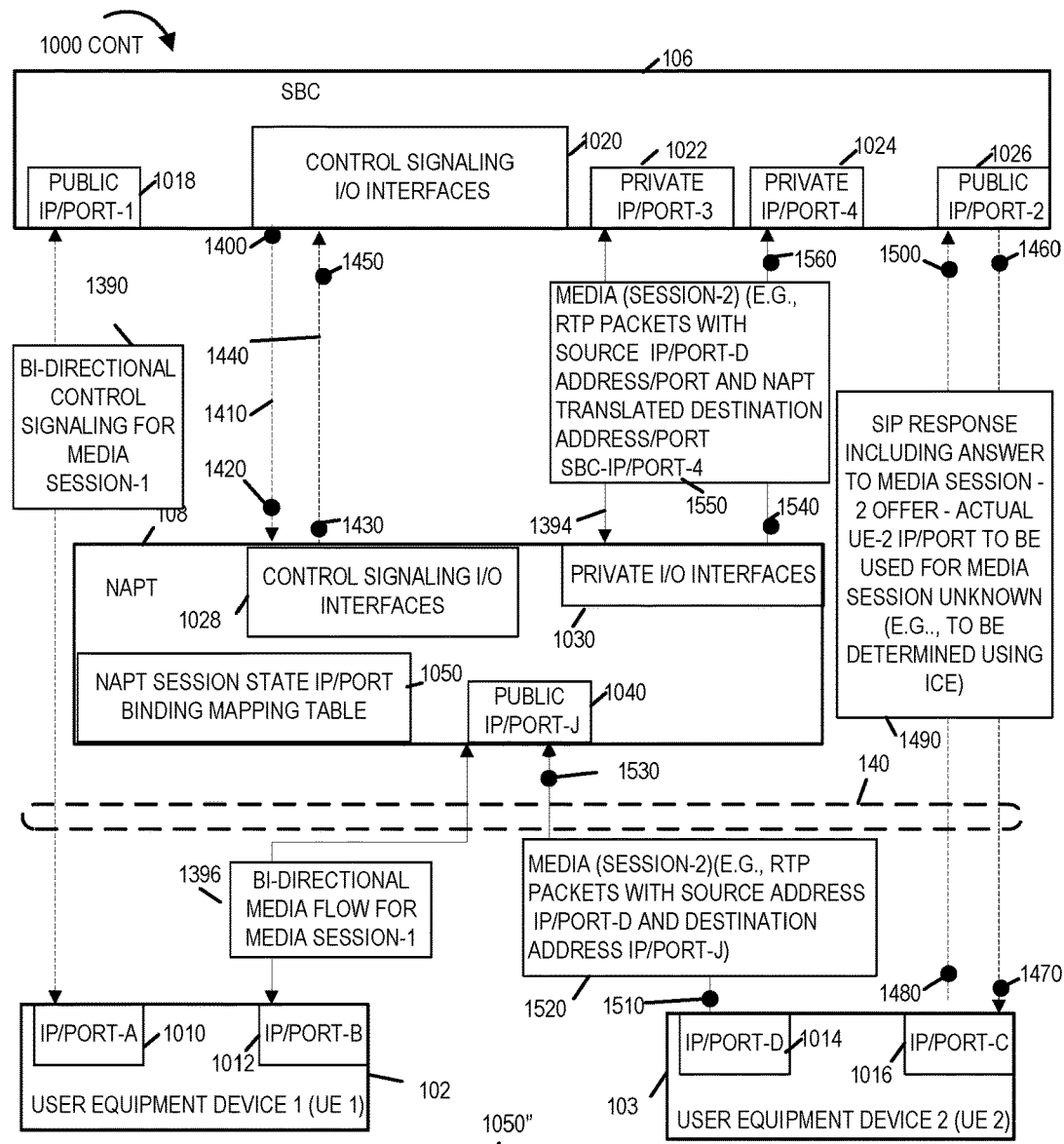
FIG. 10F illustrates an exemplary communications system and a sixth part of an exemplary method in accordance with one embodiment of the present invention.

In step 1530, the NAPT 108 receives the media 1520 which are part of media session-2, e.g., RTP packet messages, at public IP/port-J 1040. The NAPT 108 upon receiving the media 1530 performs a search and/or lookup in the NAPT session state IP/report binding mapping table 1050' to determine the destination IP address/port translation to be performed. The search and/or lookup is based on the identification of the NAPT IP/port on which the media was received and the source IP/port from which the media was sent. In this example, the NAPT IP/port on which the media was received is NAPT public IP/port-J 1040 and the source IP address/port is IP/port-D. At this time as the NAPT session state IP/port binding mapping table shown in FIG. 10F illustrates, the system has two media sessions which are currently using the NAPT public IP/port-J. Media session-1 which is an on-going media session which has completed the learning phase and media session-2 which in the learning phase. The source address of the media 1520 is IP/port-D. A search of the NAPT session state IP/port binding mapping table 1050" shows that there is no entry in the table remote IP/port corresponding to IP/port-D. The NAPT 108 then uses the local pubic IP/port to SBC private IP/port binding mapping to determine the destination address for the received media 1520. In this example, as shown in table 1050" row 3, the NAPT local public IP/port-J is mapped to SBC IP/port-4. The NAPT 108 determines that the media 1520 is to be sent to SBC private IP/port-4 1024. Operation proceeds from step 1530 to step 1540.

In step 1540, the NAPT 108 transmits or forwards the received media 1520 of media session-2 from one of the NAPT private I/O Interfaces 1030 to the SBC 106 private IP/port-4 identified in the search or lookup of the NAPT session state IP/port binding mapping table 1050" row 3. The transmitted or forwarded media 1550 includes the media, e.g., RTP packets with source address IP/port-B and NAPT translated destination address/port SBC IP/port-4. In some embodiments, the NAPT 108 opens up a virtual tunnel between NAPT 108 and the SBC 106 for exchanging media for media session-2. Operation proceeds from step 1540 to step 1560.

In step 1560, the media 1550, e.g., RTP packets, is received at the SBC 106 private IP/port-4 1024. Operation proceeds from step 1560 shown on FIG. 10F to step 1570 shown on FIG. 10G.

In step 1570, the SBC 106 learns media session-2 actual remote IP/port, e.g., through the ICE procedure. In this example, the SBC 106 processes the received packets and learns or determines that the media is part of media session-2 based on the SBC IP/port on which the media was received.

It looks up the media session associated with the SBC private IP/port-4 and determines that media received on this IP/port corresponds to media session-2. The SBC 106 determines the actual remote IP/port of UE 2 103 being used by UE 2 to send and receive media for media session-2 for example using the ICE procedure and/or identifying the remote IP address/port from the first RTP packet received. In this example, the SBC 106 learns or determines the actual remote IP/port for media session-2 using the ICE procedure. The remote IP/port address of UE 2 103 for media session-2 is the source IP address/port of the received media which is IP/port-D. SBC 106 updates a table of active sessions it contains in memory to identify that media for media session-2 is being received on SBC private IP/port-4 1024 from actual remote IP/port IP/port-D. The SBC 106 also updates the table to reflect that media received from UE 1 102 as part of media session-1 is to be routed to UE 2 103 on media session-2 as the SBC is acting as back to back user agent for media communications between UE 1 102 and UE 2 103. That is media received on SBC private port IP/port-3 is transmitted to UE 2 103 remote port IP/port-D 1014 upon its receipt at SBC 106. Similarly, media received on SBC private IP/port-4 is transmitted to UE 1 102 remote IP/port-B upon its receipt at SBC private IP/port-3.

The SBC 106 generates an update signal or message 1590, update (NAPT local public IP/port-J; remote IP/port-D) to send to the NAPT 108 to update the NAPT 108 on the actual remote IP/port being used by UE 2 103 for media session-2. In this example, the UPDATE message includes NAPT local public IP/port parameter is set to IP/port-J and the learned actual remote IP/port parameter is set to IP/port-D. This update message is in the same or a similar format to the update 1310 previously discussed. In some embodiments, if an allocation request identifier was included in the allocation request 1410, the same identifier is included in the update request message allowing the NAPT 108 to correlate which binding/mapping that is to be updated. In some such embodiments, the NAPT local pubic IP/port parameter does not need to be included in the update request. In some embodiments, a media session identifier identifying the session for which the remote IP/port is included if the NAPT 108 was previously provided an identifier for media session-2 by the SBC-106. The media session identifier, i.e., media session-2, may then be used for correlating which bindings/mappings are to be updated. The generated update request message 1590 is transmitted or sent from the SBC 106 control signaling I/O interface 1020 to the NAPT 108. Operation proceeds from step 1570 to step 1600.

In step 1600, the NAPT 108 receives the Update request signal/message at NAPT control signaling I/O Interfaces 1028. The NAPT 108 processes the received Update request. The NAPT 108 identifies the entries in the NAPT session state IP/port binding mapping table 1050" shown on FIG. 10F which need to be updated and updates those entries. In this example, row 3 needs to be updated. Row 3' shown on FIG. 10G in NAPT session state IP/port binding mapping table 1050''' shows the updates performed by NAPT 108 in response to receiving the update request 1590. The session state in row 3 changed from learning phase for media session-2 to learning phase for media session-2 completed/session ongoing in row 3'. The allocated NAPT public IP/port remains public IP/port-J in row 3'. The local public IP/port is changed from public IP/port-J in row 3 to a * in row 3' indicating no entry as local IP/port-J has been released, i.e., any media packets received at NAPT IP/port-J without a matching remote IP/port in this binding table will be discarded. The remote IP/port entry in row 3 is changed from * indicating no entry to IP/port-D in row 3' which is the actual IP/port destination being used by UE 2 130 for media session-2 learned by SBC 106 and communicated to the NAPT 108 in the Update message 1590. The SBC private IP/port remains SBC IP/port-4. It should be noted that although the reservation on the local public IP/port-J has been released the public IP/port-J remains actively bound/mapped to SBC private IP/port-4 for media session-2 through the remote IP/port entry in the table. The NAPT 108 releases the reservation on the local public IP/port-J and makes determinations on where to send incoming media received on the NAPT 108 public IP/port-J 1040 based on the remote IP/port address which is the source IP/port address from which the packets are received. With the release of the reservation of the local public IP/port-J, the NAPT 108 places the NAPT public IP/port-J 1040 back into the pool for use in connection with requests for the allocation of local public IP/port pairs for new media sessions. As previously explained, the NAPT 108 is designed to serve as IP multiplexer receiving media from a plurality of different IP/port sources on a single public IP/port and routing the media to the correct SBC private IP/port on SBC 106 based on the remote IP/port from which the media is received as well as being able to simultaneously reserve a particular SBC 106 private IP/port mapping for a single media session which is in the remote IP/port learning phase. At this point the media session-1 and media session-2 are both on-going sessions.

Figure 10G:
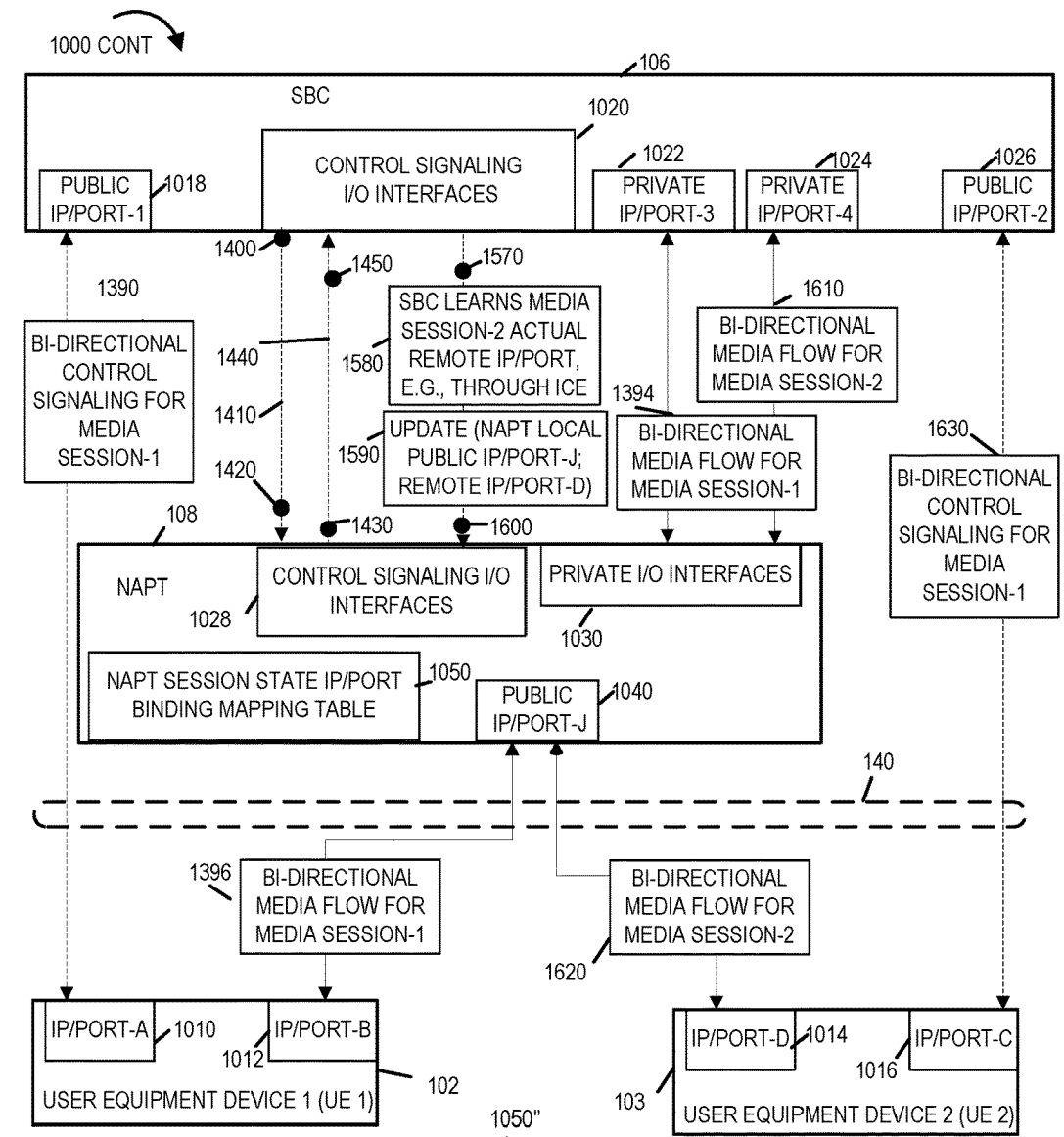
FIG. 10G illustrates an exemplary communications system and a seventh part of an exemplary method in accordance with one embodiment of the present invention.

Operation proceeds from step 1600 to step 1610 shown on FIG. 10G. The manner in which the SBC 106 sends or transmits media for media session-2 will now be explained.

At this time, as shown on FIG. 10G, bi-directional control signaling 1630 for media session-2 is exchanged between SBC 106 public IP/port-2 1028 and UE 2 103 IP/port-C 1016. Also shown in FIG. 10G, is the bi-directional media flow for media session-2 between UE 2 103 and SBC 106 which passes through NAPT 108. Media 1620 for media session-2 is communicated to/from IP/port-B on UE 2 103 from/to NAPT 108 public IP/port-J 1040. The media 1610 for media session-2 is communicated to/from NAPT 108 private I/O Interfaces 1030 from/to SBC 106 private IP/port-4. The NAPT 108 pubic IP/port-J 1040 is in the pool of available NAPT public IP/ports that can be allocated for new media sessions as each of the current session for which it is used the remote IP/port is known.

FIG. 11 illustrates NAPT session state IP/port binding mapping table 2000 which shows the various mappings bindings at each state of operation for the media sessions 1 and 2 as described in connection with the exemplary method 1000 illustrated in FIG. 10.

FIG. 12 illustrates NAPT session state IP/port binding mapping table 3000 which illustrates the final mappings/bindings for the ending media 1 and media 2 sessions of the exemplary method 1000 after the NAPT 108 has been updated with the actual remote IP address/port pair for each of the media sessions. As is readily apparent from table 3000, the NAPT public IP/port-J is mapped to two different SBC private IP address/port pairs based on the remote IP address/port pair information as the NAPT 108 serves as an IP multiplexer therein conserving public IP address and port number pair resources.

Using the method 1000 described in FIGS. 10A, 10B, 10C, 10D, 10E, 10F, 10G, 11 and 12 the communications system was able to efficiently manage the use of public IP/ports to reduce the number of public IP/ports used in establishing and maintaining media sessions. Instead of reserving and dedicating a SBC public IP/port for each of the media sessions, media session-1 and media session-2, for the entirety of the media session, a single public IP/port on the NAPT 108 was utilized for both media sessions and that single public IP/port was only reserved or dedicated for each of the individual sessions during the remote IP/port address learning phase of the session. In this way, the number of public IP/ports needed to handle multiple media sessions is greatly reduced which results in the ability to handle more media sessions. Furthermore, in those instances where the public IP/port addresses are leased, e.g., on a cost per usage basis the cost will be greatly reduced resulting in monetary savings.

Various embodiments of the invention will now be described.

A method embodiment 1 of operating a communication system, the method comprising: receiving, at a real time communications entity (SBC), a first media session offer from a first device (UE1), transmitting, from the real time communications entity (SBC) to a Network Address and Port Translation (NAPT) entity, a request signal to allocate a public Internet Protocol (IP) address and port number pair corresponding to an interface on the NAPT entity for the first session; determining, at the real time communications entity (SBC), a remote IP address and port number pair corresponding to an interface on the first device (UE 1) to be used for communicating media of the first media session, transmitting, from the real time communications entity (SBC) to the NAPT entity, a signal identifying the determined remote IP address and port number pair; releasing, at the NAPT entity, the allocated public IP address and port number pair.

A method embodiment 1B, the method embodiment 1 wherein the media session offer is transmitted from the first device to an interface corresponding to a public IP address/port number pair of the real time communications entity (SBC)

A method embodiment 1C, the method embodiment 1B wherein the session offer is included in a Session Description Protocol offer message included in a Session Initiation Protocol INVITE message transmitted from said first device to the real time communications entity.

A method embodiment 1D, the method embodiment 1C wherein the session answer is included in a Session Description Protocol answer message included in a SIP response message transmitted from the real time communications entity (SBC) to the first device.

A method embodiment 2, the method embodiment 1 wherein the real time communications entity is a Session Border Controller.

A method embodiment 2A, the method embodiment 2 wherein the Session Border Controller is implemented as a virtual machine deployed on a computer in the cloud.

A method embodiment 3, the method embodiment 1 wherein the NAPT entity is implemented as a virtual machine deployed on a computer in the cloud.

A method embodiment 4, the method embodiment 2 wherein the Session Border Controller uses an Interactive Connectivity Establishment protocol procedure in determining the actual remote IP address and port number pair.

A method embodiment 5, the method embodiment 4 wherein the Session Border Controller determines the remote IP address and port number pair from the first Real Time Transport Protocol (RTP) packet of the first media session received by the Session Border controller.

A method embodiment 6, the method of claim 1 wherein the first media session offer is a Session Description Offer message identifying at least one media stream included in a SIP Invite message.

A method embodiment 7, the method embodiment 6 wherein the answer to the first media session offer is a SDP answer message including the local public IP address and port number pair allocated by the NAPT entity.

A method embodiment 8, the method embodiment 1 wherein the NAPT entity performs an Internet Protocol address multiplexing operation.

A method embodiment 9, the method embodiment 1 wherein the NAPT allocates the released local IP address public IP address and port number pair for use in connection with a second media session while said first media session is still active.

A method embodiment 10, the method of operating a communications system, comprising: receiving at a public IP address and port number pair interface of a real time communications entity, an offer for a media session from a first device; receiving media packets at an interface corresponding to a public IP address and port number pair of a network address and port translation (NAPT) device, allocated to said media session; obtaining a private Internet protocol address and port number pair from a translation table corresponding to an interface on the real time communications device allocated for sending and receiving media packets of said media session based on a reserved local public IP address and port number pair when the real time communications entity is operating in a learning mode of operation with respect to determining the remote IP address and port number pair being used by the first device for the media session.

A method embodiment 11, the method embodiment 10 further comprising: obtaining the private Internet protocol address and port number pair from the translation table corresponding to the interface on the real time communications device allocated for sending and receiving media packets of said media session based on the remote IP address and port number pair being used by the first device for the media session when the real time communications entity is operating in a completed learning mode of operation with respect to determining the remote IP address and port number pair being used by the first device for the media session.

A communication system embodiment 1 comprising: a Network Address and Port Translation entity (NAPT); and a real time communications entity including: a receiver configured to receive a first media session offer from a first device (UE1); a transmitter configured to transmit from the real time communications entity (SBC) to the Network Address and Port Translation (NAPT) entity, a request signal to allocate a public Internet Protocol (IP) address and port number pair corresponding to an interface on the NAPT entity for the first session; a determinator configured to determine a remote IP address and port number pair corresponding to an interface on the first device (UE 1) to be used for communicating media of the first media session; the transmitter further configured to transmit, from the real time communications entity (SBC) to the NAPT entity, a signal identifying the determined remote IP address and port number pair; and said NAPT entity including: a release module configured to release, at the NAPT entity, the allocated public IP address and port number pair.

A communications system embodiment 1B, the communications system embodiment 1 wherein the media session offer is transmitted from the first device to an interface corresponding to a public IP address/port number pair of the real time communications entity (SBC).

A communications system embodiment 1C, the communications system embodiment 1B wherein the session offer is included in a Session Description Protocol offer message included in a Session Initiation Protocol INVITE message transmitted from said first device to the real time communications entity.

A communications systems embodiment 1D, the communications system embodiment 1C wherein the session answer is included in a Session Description Protocol answer message included in a SIP response message transmitted from the real time communications entity (SBC) to the first device.

A communications systems embodiment 2, the communications system embodiment 1 wherein the real time communications entity is a Session Border Controller.

A communication system embodiment 2A, the communications system of communications system embodiment 2 wherein the Session Border Controller is implemented as a virtual machine deployed on a computer in the cloud.

A communications system embodiment 3, the communications system embodiment 1 wherein the NAPT entity is implemented as a virtual machine deployed on a computer in the cloud.

A communications system embodiment 4, the communications system embodiment 2 wherein the determinator of the Session Border Controller is further configured to use an Interactive Connectivity Establishment protocol procedure in determining the actual remote IP address and port number pair.

A communication system embodiment 5, the communications system embodiment 4 wherein the determinator of the Session Border Controller is further configured to determine the remote IP address and port number pair from the first Real Time Transport Protocol (RTP) packet of the first media session received by the Session Border Controller.

A communications system embodiment 6, the communications system embodiment 1 wherein the first media session offer is a Session Description Offer message identifying at least one media stream included in a SIP Invite message.

A communications system embodiment 7, the communications system embodiment 6 wherein the answer to the first media session offer is a SDP answer message including the local public IP address and port number pair allocated by the NAPT entity.

A communications system embodiment 8, the communications system embodiment 1 wherein the NAPT entity is configured to perform an Internet Protocol address multiplexing operation.

A communications system embodiment 9, the communications system embodiment 1 wherein the NAPT is configured to allocate the released local IP address public IP address and port number pair for use in connection with a second media session while said first media session is still active.

A communications system embodiment 10 comprising: a real time communications entity configured to receive at an interface corresponding to a public IP address and port number pair an offer for a media session from a first device; and a Network Address and Port Translation (NAPT) device configured to operate in a learning mode of operation with respect to determining a remote IP address and port number pair of the first device to be used for the media session, said NAPT device configured to obtain from a translation table a private Internet protocol address and port number pair allocated for sending and receiving media packets of said media session based on a reserved local public IP address and port number pair when the real time communications entity is operating in said learning mode of operation with respect to determining the remote IP address and port number pair being used by the first device for the media session.

A communications system embodiment 11, the communications system embodiment 10 wherein said NAPT device is further configured to operate in a completed learning mode of operation with respect to determining the remote IP address and port number pair being used by the first device for the media session, said completed learning mode of operation including retrieving from the translation table the private Internet protocol address and port number pair corresponding to the private Internet Protocol address and port number pair allocated for sending and receiving media packets of said media session, said retrieving based on the remote IP address and port number pair being used by the first device for the media session.

As previously explained, various features of the invention allow for effectively managing the use of public IP addresses and IP address/port number pairs in communications systems.

The techniques of various embodiments may be implemented using software, hardware and/or a combination of software and hardware. Various embodiments are directed to apparatus, e.g., border controllers, telecommunications systems, network nodes and/or network equipment devices. Various embodiments are also directed to methods, e.g., method of controlling and/or operating NAPT devices, session border controllers, user devices, IP multiplexers, realtime communications entities, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more modules to perform the steps corresponding to one or more methods, for example, message reception, signal processing, sending, comparing, determining and/or transmission steps. Thus, in some embodiments various features are implemented using modules or in some embodiments logic such as for example logic circuits. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes.

Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a communications system, comprising:
receiving, from a real time communications entity by a Network Address and Port Translation (NAPT) device, a first reservation request for a public IP address and port number pair interface of the NAPT device for use by a first media session;
reserving, at the NAPT device, a first public IP address and port number pair interface of the NAPT device in response to said first reservation request;
upon reserving the first public IP address and port number pair interface of the NAPT device for use by the first media session, controlling the Network Address and Port Translation (NAPT) device to operate in a learning mode of operation with respect to determining a remote IP address and port number pair corresponding to an interface of a first device, said interface of said first device being used for the first media session;
subsequent to reserving the first public IP address and port number pair interface of the NAPT device for use by the first media session, receiving at the first public Internet Protocol (IP) address and port number pair interface of the NAPT device a first media packet from the first device while operating in said learning mode of operation with respect to determining the remote IP address and port number pair being used by the first device for the first media session;
obtaining a first private Internet Protocol address and port number pair corresponding to a first private IP address and port number pair interface of the real time communications entity from an IP address and port number pair translation table located in the NAPT device based on a public IP address and a port number of the public IP address and port number pair interface at which the first media packet was received while operating in said learning mode of operation with respect to determining the remote IP address and port number pair being used by the first device for the first media session;
transmitting the first media packet from the NAPT device to the first private IP address and port number pair interface of the real time communications entity while operating in said learning mode of operation with respect to determining the remote IP address and port number pair being used by the first device for the first media session.

2. The method of claim 1, wherein said real time communications entity is a session border controller located in the cloud.

3. The method of claim 2, wherein said session border controller and said NAPT device are located in the same IP realm.

4. The method of claim 3,
wherein the NAPT device determines the remote IP address and port number pair corresponding to the interface of the first device being used for the first media session from a proprietary message received from the real time communications entity;
wherein said real time communications entity is located on the signaling and media path between the first device and a second device; and
wherein said first media session is established between the first device and the second device.

5. The method of claim 3,
wherein said NAPT device is implemented as a virtual machine located in the cloud.

6. The method of claim 1,
wherein said reserving, at the NAPT device, the first public IP address and port number pair interface of the NAPT device in response to said first reservation request includes updating the IP address and port number pair translation table located in the NAPT device to include information indicating all media packets received at the first public IP address and port number pair interface of the NAPT device without source IP address and port number pair information known to the NAPT device are to be transmitted to the first private Internet Protocol address and port number pair corresponding to the first private IP address and port number pair interface of the real time communications entity from a first private IP address and port number pair interface of the NAPT device.

7. The method of claim 6, wherein the source IP address and port number pair information known to the NAPT device are source IP address and port number pairs identified to said NAPT by said real time communications entity in connection with media sessions for which media packets are being received at the first public IP address and port number pair interface of the NAPT device.

8. The method of claim 6,
wherein the first reservation request from the real time communications entity includes information identifying the first private IP address and port number pair corresponding to the first private IP address and port number pair interface of the real time communications entity.

9. The method of claim 8 further comprising:
receiving at the NAPT device from the real time communications entity a message indicating the remote IP address and port number pair corresponding to the interface of the first device being used for the first media session; and
controlling, the NAPT device, to switch from operating in the learning mode of operation with respect to determining the remote IP address and port number pair corresponding to the interface of the first device to operating in a learned mode of operation in connection with the remote IP address and port number pair corresponding to the interface of the first device.

10. The method of claim 9 further comprising:
after receiving at the NAPT device from the real time communications entity the message indicating the remote IP address and port number pair corresponding to the interface of the first device being used for the first media session updating information in the IP address and port number pair translation table located in the NAPT device, said updating information in the IP address and port number pair translation table located in the NAPT device comprising including information indicating that any media packets received at the first public IP address and port number pair interface of the NAPT device including a source IP address and port number pair corresponding to the remote IP address and port number pair corresponding to the interface of the first device are to be transmitted to the first private IP address and port number pair of the real time communications entity from the first private IP address and port number pair interface of the NAPT device.

11. The method of claim 10,
wherein said updating information in the IP address and port number pair translation table located in the NAPT device further comprises: indicating all media packets received at the first public IP address and port number pair interface of the NAPT device with an unknown source IP address and port number pair are to be discarded.

12. The method of claim 2 further comprising:

receiving at the first public Internet Protocol (IP) address and port number pair interface of the NAPT device a second media packet from the first device while operating in a learned mode of operation with respect to determining the remote IP address and port number pair corresponding to the interface of the first device, said second media packet including a source IP address and port number pair matching the remote IP address and port number pair of the first device;

obtaining the first private Internet Protocol address and port number pair corresponding to the first private IP address and port number pair interface of the real time communications entity from the IP address and port number pair translation table located in the NAPT device based on: (i) the public IP address and port number pair of the public IP address and port number pair interface at which the second media packet was received, and (ii) the source IP address and port number pair included in the second media packet while operating in said learned mode of operation with respect to determining the remote IP address and port number pair corresponding to the interface of the first device;

transmitting the second media packet from the NAPT device to the first private IP address and port number pair interface of the real time communications entity while operating in said learned mode of operation with respect to determining the remote IP address and port number pair corresponding to the interface of the first device.

13. The method of claim 4 further comprising:

prior to receiving the first reservation request by the NAPT device from the real time communications entity, receiving at a first public IP address and port number pair interface of the real time communications entity a first session initiation protocol message including a first session description protocol offer message from the first device, said first session description protocol offer message including a plurality of candidate IP address port pairs corresponding to the first device for the first media session.

14. A communications system, comprising:

a Network Address and Port Translation (NAPT) device, said NAPT device including a first processor, said first processor controlling the NAPT device to:

receive from a real time communications entity a first reservation request for a public IP address and port number pair interface of the NAPT device for use by a first media session;

reserve, at the NAPT device, a first public IP address and port number pair interface of the NAPT device in response to receiving said first reservation request;

upon reserving the first public IP address and port number pair interface of the NAPT device for use by the first media session, operate in a learning mode of operation with respect to determining a remote IP address and port number pair corresponding to an interface of a first device, said interface of said first device being used for the first media session;

subsequent to receiving the first reservation request, receive at the first public Internet Protocol (IP) address and port number pair interface of the NAPT device a first media packet from the first device while operating in said learning mode of operation with respect to determining the remote IP address and port number pair being used by the first device for the first media session;

obtain a first private Internet Protocol address and port number pair corresponding to a first private IP address and port number pair interface of the real time communications entity from an IP address and port number pair translation table located in the NAPT device based on a public IP address and a port number of the public IP address and port number pair interface at which the first media packet was received while operating in said learning mode of operation with respect to determining the remote IP address and port number pair being used by the first device for the first media session; and transmit the first media packet from the NAPT device to the first private IP address and port number pair interface of the real time communications entity while operating in said learning mode of operation with respect to determining the remote IP address and port number pair being used by the first device for the first media session.

15. The communications system of claim 14 wherein said first processor further controls the NAPT device to:

obtain the private Internet protocol address and port number pair from the translation table corresponding to the interface on the real time communications entity allocated for sending and receiving media packets of said first media session based on the remote IP address and port number pair being used by the first device for the first media session when the real time communications entity is operating in a completed learning mode of operation with respect to determining the remote IP address and port number pair being used by the first device for the first media session.

16. The communications system of claim 15, wherein said real time communications entity is a session border controller.

17. The communications system of claim 16, wherein said NAPT device performs an Internet Protocol address multiplexing operation.

18. The communications system of claim 14, wherein said NAPT device is implemented as a virtual machine located in the cloud.

19. A non-transitory computer readable medium including a first set of computer executable instructions which when executed by a processor of a Network Equipment and Port Translation (NAPT) device cause the NAPT device to perform the steps of:

receiving from a real time communications entity a first reservation request for a public IP address and port number pair interface of the NAPT device for use by a first media session;

reserving, at the NAPT device, a first public IP address and port number pair interface of the NAPT device in response to receiving said first reservation request;

upon reserving the first public IP address and port number pair interface of the NAPT device for use by the first media session, operating in a learning mode of operation with respect to determining a remote IP address and port number pair corresponding to an interface of a first device, said interface of said first device being used for the first media session;

subsequent to receiving the first reservation request, receiving at the first public Internet Protocol (IP) address and port number pair interface of the NAPT device a first media packet from the first device while operating in said learning mode of operation with respect to determining the remote IP address and port number pair being used by the first device for the first media session;

obtaining a first private Internet Protocol address and port number pair corresponding to a first private IP address and port number pair interface of the real time communications entity from an IP address and port number pair translation table located in the NAPT device based on a public IP address and a port number of the public IP address and port number pair interface at which the first media packet was received while operating in said learning mode of operation with respect to determining the remote IP address and port number pair being used by the first device for the first media session; and transmitting the first media packet from the NAPT device to the first private IP address and port number pair interface of the real time communications entity while operating in said learning mode of operation with respect to determining the remote IP address and port number pair being used by the first device for the first media session.

20. The non-transitory computer readable medium of claim 19, wherein said real time communications device is a session border controller.

\* \* \* \* \*